(12) United States Patent
Baik

(10) Patent No.: US 10,732,286 B2
(45) Date of Patent: Aug. 4, 2020

(54) VEHICLE AND METHOD OF RECOGNIZING POSITION OF VEHICLE BASED ON MAP

(71) Applicant: Samsung Electronics Co., Ltd., Suwon-si, Gyeonggi-do (KR)

(72) Inventor: Aron Baik, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 599 days.

(21) Appl. No.: 15/181,846

(22) Filed: Jun. 14, 2016

(65) Prior Publication Data

US 2017/0227647 A1 Aug. 10, 2017

(30) Foreign Application Priority Data

Feb. 5, 2016 (KR) .................. 10-2016-0015215

(51) Int. Cl.
| | |
|---|---|
| *G01S 17/931* | (2020.01) |
| *G01S 19/42* | (2010.01) |
| *G01S 19/48* | (2010.01) |
| *G01S 7/48* | (2006.01) |
| *G01S 17/42* | (2006.01) |
| *G01S 17/89* | (2020.01) |

(Continued)

(52) U.S. Cl.
CPC ............ *G01S 17/931* (2020.01); *G01C 21/30* (2013.01); *G01S 7/4802* (2013.01); *G01S 7/4808* (2013.01); *G01S 7/4815* (2013.01); *G01S 17/06* (2013.01); *G01S 17/42* (2013.01); *G01S 17/89* (2013.01); *G01S 19/42* (2013.01); *G01S 19/48* (2013.01); *G01S 17/86* (2020.01)

(58) Field of Classification Search
None
See application file for complete search history.

(56) References Cited

U.S. PATENT DOCUMENTS 6,236,666 B1 * 5/2001 Mirov .................. H01S 5/4062
372/101
6,664,529 B2 12/2003 Pack et al.
(Continued)

FOREIGN PATENT DOCUMENTS

| JP | 2009-264983 A | 11/2009 |
|---|---|---|
| JP | 2013-210346 A | 10/2013 |

(Continued)

OTHER PUBLICATIONS

Kher, Hyperspectral Mapping of the Geology of Afghanistan, Rapid Uplift, http://suvratk.blogspot.kr/2012/07/hyperspectral-mapping-of-geology-of.html.

(Continued)

*Primary Examiner* — Eric L Bolda
(74) *Attorney, Agent, or Firm* — Jefferson IP Law, LLP

(57) ABSTRACT

A vehicle is provided. The vehicle includes a light detection and ranging (LiDAR) sensor to acquire point cloud information for each channel on a surrounding ground of the vehicle by using a multichannel laser. The vehicle further includes a communicator to communicate with an external server, and a processor to control the communicator to receive map data from the external server and to determine a position of the vehicle in the map data based on the point cloud information for each channel, acquired through the LiDAR sensor.

18 Claims, 26 Drawing Sheets

(51) Int. Cl.
*G01S 7/481* (2006.01)
*G01S 17/06* (2006.01)
*G01C 21/30* (2006.01)
*G01S 17/86* (2020.01)

(56) References Cited

U.S. PATENT DOCUMENTS

| | | | |
|---|---|---|---|
| 9,043,072 B1* | 5/2015 | Tisdale | G05D 1/021 |
| | | | 701/28 |
| 2006/0089764 A1 | 4/2006 | Filippov et al. | |
| 2008/0033645 A1* | 2/2008 | Levinson | G01C 15/00 |
| | | | 701/469 |
| 2011/0060478 A1 | 3/2011 | Nickolaou | |
| 2012/0059720 A1* | 3/2012 | Musabji | G01C 21/3638 |
| | | | 705/14.58 |
| 2012/0281907 A1 | 11/2012 | Samples et al. | |
| 2014/0240501 A1 | 8/2014 | Newman et al. | |
| 2014/0333468 A1 | 11/2014 | Zhu et al. | |
| 2015/0185021 A1 | 7/2015 | Oh et al. | |
| 2015/0213637 A1 | 7/2015 | Lynch | |
| 2015/0266472 A1 | 9/2015 | Ferguson et al. | |
| 2016/0178802 A1* | 6/2016 | Stainvas Olshansky | |
| | | | G01S 17/95 |
| | | | 356/341 |
| 2016/0266243 A1* | 9/2016 | Marron | G01S 7/4863 |
| 2019/0219697 A1* | 7/2019 | Castorena Martinez | |
| | | | G01C 21/30 |

FOREIGN PATENT DOCUMENTS

| | | |
|---|---|---|
| KR | 10-0720595 B1 | 5/2007 |
| KR | 10-2008-0093569 A | 10/2008 |
| KR | 10-2012-0119750 A | 10/2012 |
| KR | 10-1475896 B1 | 12/2014 |
| KR | 10-2015-0004743 A | 1/2015 |

OTHER PUBLICATIONS

Park et al., Construction of Noisemap Using LiDAR Data, The Korean Society for Noise and Vibration Engineering, 2013, pp. 555-556.

European Search Report dated Oct. 29, 2018, issued in European Patent Application No. 17747628.0.

* cited by examiner

Types of surfaces identifiable using multi-spectral imaging

Types of minerals identifiable using multi-spectral imaging

VEHICLE AND METHOD OF RECOGNIZING POSITION OF VEHICLE BASED ON MAP

CROSS-REFERENCE TO RELATED APPLICATION(S)

This application claims the benefit under 35 U.S.C. § 119(a) of a Korean patent application filed on Feb. 5, 2016 in the Korean Intellectual Property Office and assigned Serial number 10-2016-0015215, the entire disclosure of which is hereby incorporated by reference.

TECHNICAL FIELD

The present disclosure relates to a vehicle and a method of recognizing a position of a vehicle based on a map. More particularly, the present disclosure relates to a vehicle including a light detection and ranging (LiDAR) sensor and a method of recognizing a position of a vehicle based on a map.

BACKGROUND

An autonomous driving vehicle refers to a vehicle that recognizes without driver intervention, determines a driving condition, and controls the vehicle to autonomously drive to a given destination. Recently, the autonomous driving vehicle has decreased the number of traffic accidents, enhanced transportation efficiency, saved fuel, and done driving instead and, thus, has attracted attention as individual transportation for enhancing convenience.

For autonomous driving of vehicles, there is a need for various technologies such as a technology for recognizing a driving environment such as a lane, a surrounding vehicle, or a pedestrian, a technology for determining a driving condition, and a control technology such as steering and acceleration/deceleration. Among these, a technology for accurately determining a vehicle position is very important. That is, a detailed map with an error range of a centimeter unit needs to be generated and an accurate position of the vehicle needs to be determined on the generated detailed map.

Technologies of the related art for determining a vehicle position use a global positioning system (GPS), Wi-Fi, or the like but there is a limit due to insufficient accuracy. Accordingly, in order to compensate for the limitation, recently, research has been conducted into a technology using a light detection and ranging (LiDAR) sensor for measuring time during which a laser pulse is emitted and is reflected back to an original position to measure a distance from a reflector.

In this situation, for autonomous driving of various vehicles including cars, there has been a need for a technology for generating a more detailed map of an actual load environment and to more accurately determine a position of a moving object on the detailed map.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a vehicle and a method of recognizing a position of a vehicle based on a map, for generating a detailed map for autonomous driving of the vehicle and determining an accurate position in the detailed map.

In accordance with an aspect of the present disclosure, a vehicle is provided. The vehicle includes a light detection and ranging (LiDAR) sensor configured to acquire point cloud information for each channel on a surrounding ground of the vehicle using a multichannel laser, a communicator configured to communicate with an external server, and a processor configured to control the communicator to receive map data from the external server and to determine a position of the vehicle in the map data based on the point cloud information for each channel, acquired through the LiDAR sensor.

The map data may be multichannel map data including reflectivity information for each channel of the multichannel laser, and the processor may match the point cloud information for each channel, acquired through the LiDAR sensor, and the multichannel map data to determine the position of the vehicle.

The map data may be a single-channel map data obtained by synthesizing reflectivity information for each channel of the multichannel laser, and the processor may synthesize the point cloud information for each channel acquired through the LiDAR sensor into single-channel point cloud information and match the synthesized single-channel point cloud information and the single-channel map data to determine the position of the vehicle.

The processor may multiply reflectivity information included in the point cloud information for each channel by a weight for each channel and sums the reflectivity information for each channel, multiplied by the weight, to synthesize the point cloud information for each channel into the single-channel point cloud information.

The processor may calculate variance or standard deviation of the reflectivity information included in the point cloud information for each channel, and may multiply a channel with a greater calculated variance value or standard deviation by a greater weight.

The processor may rasterize the point cloud information acquired through the LiDAR sensor into two-dimensional (2D) data, perform reflected-light removal on the rasterized 2D data, and match the 2D data with the reflected-light removal performed thereon and the map data to determine the position of the vehicle.

The vehicle may further include an ambient light sensor configured to detect intensity of ambient light around the vehicle, wherein the processor may adjust a degree for the reflected-light removal according to the intensity of ambient light around the vehicle, detected through the ambient light sensor.

The vehicle may further include a global positioning system (GPS) receiver configured to receive a GPS signal including positional information of the vehicle, wherein the processor may determine a position of the sun based on the GPS signal received through the GPS signal receiver and current time and use the determined position of the sun in the reflected-light removal.

The vehicle may further include a GPS receiver configured to receive a GPS signal including positional information of the vehicle, wherein the processor may determine the position of the vehicle using the GPS signal received through the GPS signal receiver and determines a position of the vehicle in the map data based on the position of the vehicle, determined using the GPS signal.

The processor may control the communicator to receive the map data corresponding to a preset distance range from the position of the vehicle, determined using the GPS signal, from the server.

In accordance with another aspect of the present disclosure, a method of recognizing a position of a vehicle based on a map is provided. The method includes receiving map data from an external server, acquiring point cloud information for each channel on a surrounding ground of the vehicle using a multichannel LiDAR sensor, and determining a position of the vehicle in the map data based on the point cloud information for each channel.

The map data may be multichannel map data including reflectivity information for each channel of the multichannel laser, and the determining of the position of the vehicle may include matching the point cloud information for each channel, acquired through the LiDAR sensor, and the multichannel map data to determine the position of the vehicle.

The map data may be a single-channel map data obtained by synthesizing reflectivity information for each channel of the multichannel laser, and the determining of the position of the vehicle may include synthesizing synthesizes the point cloud information for each channel acquired through the LiDAR sensor into single-channel point cloud information and matching the synthesized single-channel point cloud information and the single-channel map data to determine a position of the vehicle.

The synthesizing may include multiplying reflectivity information included in the point cloud information for each channel by a weight for each channel, and summing the reflectivity information for each channel, multiplied by the weight.

The multiplying with the weight may include calculating variance or standard deviation of the reflectivity information included in the point cloud information for each channel, for each channel, and multiplying a channel with a greater calculated variance value or standard deviation by a greater weight.

The determining of the position of the vehicle may include rasterizing the point cloud information acquired through the LiDAR sensor into 2D data, performing reflected-light removal on the rasterized 2D data, and matching the 2D data with the reflected-light removal performed thereon and the map data to determine the position of the vehicle.

The method may further include detecting intensity of ambient light around the vehicle, wherein the performing of the reflected-light removal may include adjusting a degree for the reflected-light removal according to the detected intensity of ambient light around the vehicle.

The method may further include receiving a GPS signal including positional information of the vehicle, wherein the performing of the reflected-light removal may include determining a position of the sun based on the received GPS signal and current time, and performing the reflected-light removal using the determined position of the sun.

The method may further include receiving a GPS signal including positional information of the vehicle, wherein the determining of the position of the vehicle may include determining the position of the vehicle using the received GPS signal and determining a position of the vehicle in the map data based on the position of the vehicle, determined using the GPS signal.

The receiving of the map data may include receiving the map data corresponding to a preset distance range from the position of the vehicle, determined using the GPS signal, from the server.

According to various embodiments of the present disclosure, a detailed map with an error range less than a centimeter unit may be generated and a position of a vehicle may be accurately determined in the generated detailed map. Accordingly, autonomous driving of the vehicle may be easily achieved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and/or other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms such as "include" or "comprise" may be construed to denote a certain characteristic, number, operation, constituent element, or a combination thereof, but may not be construed to exclude the existence of or a possibility of addition of one or more other characteristics, numbers, operations, constituent elements, or combinations thereof.

In addition, the suffixes "module" and "unit" of elements herein are used for convenience of description and thus can be used interchangeably and do not have any distinguishable meanings or functions In the description of the disclosure, certain detailed explanations of related art are omitted when it is deemed that they may unnecessarily obscure the essence of the embodiments of the disclosure.

Hereinafter, a car will be described as an example of a vehicle, without being limited thereto. For example, a vehicle may include a vessel, a motorcycle, an aircraft, and a train which are capable of being moved with passengers or goods therein. In addition, needless to say, the map generating car or map using car as used herein is also one type of a vehicle.

Certain embodiments of the present disclosure will now be described in greater detail with reference to the accompanying drawings.

Figure 1:
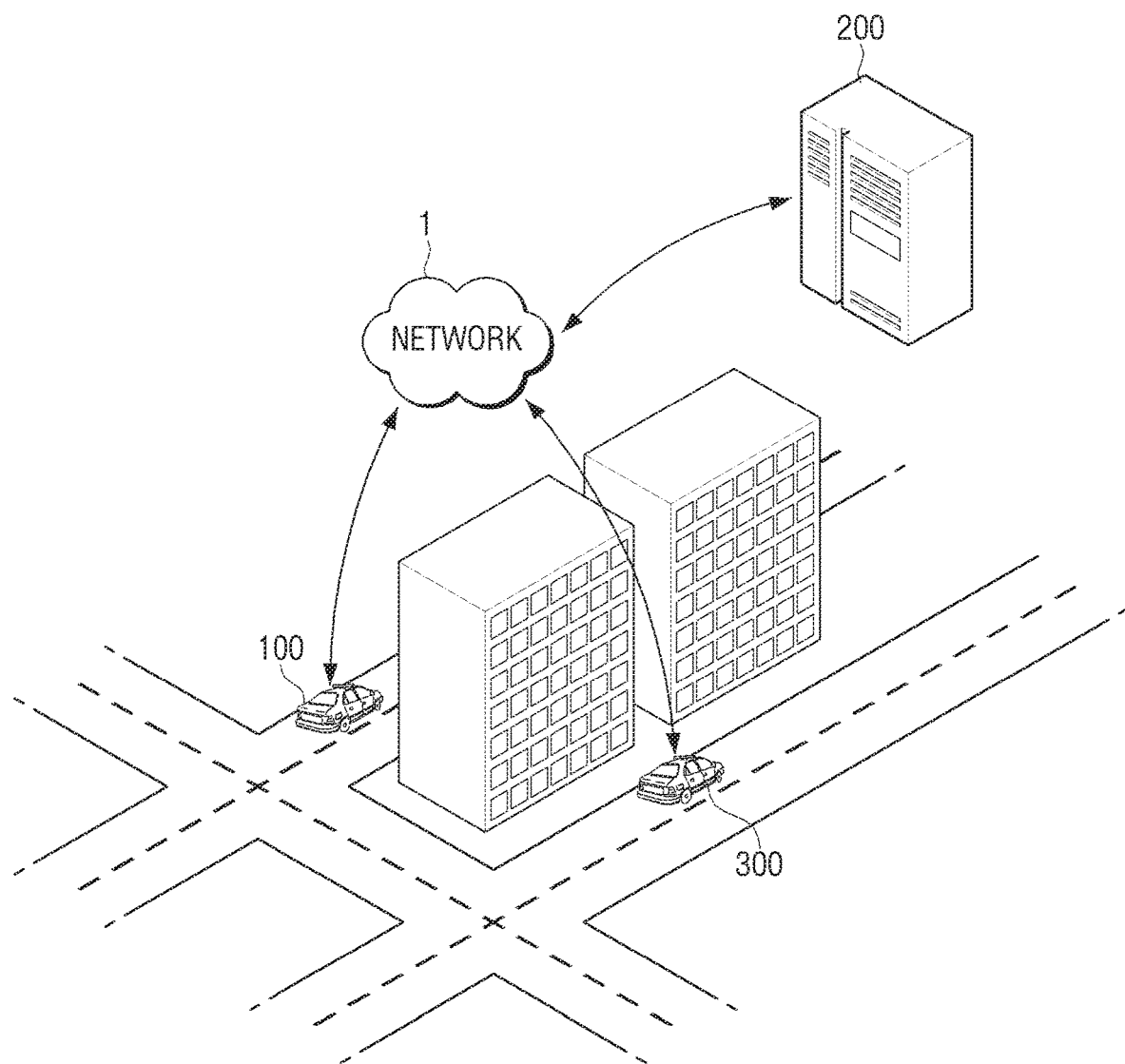
FIG. 1 is a diagram illustrating an example of an autonomous driving system according to an embodiment of the present disclosure.

FIG. 1 is a diagram illustrating an example of an autonomous driving system 10 according to an embodiment of the present disclosure.

Referring to FIG. 1, the autonomous driving system 10 may include a map generating car 100, a server 200, and a map using car 300.

The map generating car 100 may collect information for generating a map and transmit the information to the server 200. In detail, the map generating car 100 may transmit, to the server 200, point cloud information on the ground, which is acquired using a multichannel light detection and ranging (LiDAR) sensor during driving on a target place for generating a map.

In general, a LiDAR sensor refers to a sensor system that emits a high output pulse laser with a specific frequency and measures time taken to receive a reflected wave from an object to acquire information on a distance to the object.

Although there may be various LiDAR technologies, a LiDAR sensor according to various embodiments of the present disclosure may be a LiDAR sensor that is capable of performing image modeling of a space as well as distance information in a traveling direction of a laser beam. That is, the LiDAR sensor according to various embodiments of the present disclosure may be a LiDAR sensor that is capable of collecting point cloud information of a ground via point-scanning.

In addition, the LiDAR sensor used in various embodiments of the present disclosure may be a multichannel LiDAR sensor that uses a plurality of lasers with different frequencies for respective channels, but not usually a general LiDAR sensor that uses a laser with a single frequency.

Accordingly, as illustrated in FIG. 1, in order to generate a map of a road of a specific area, the map generating car 100 may scan the road using a laser with a plurality of frequencies while driving on the road of the corresponding area, acquire point cloud information for each frequency channel for the road, and transmit the information to the server 200, via a network 1.

The server 200 may generate a multichannel map of the corresponding road using the point cloud information for each channel for the road, received from the map generating car 100. In detail, the server 200 may apply various map generating algorithms to the point cloud information for each channel to generate the multichannel map with a plurality of channels and store the generated multichannel map. In this case, the generated multichannel map may be a detailed map containing reflectivity information on each point of a road surface and may be used for autonomous driving.

Although the detailed map generated for autonomous driving is technologically capable of being displayed to a consumer, it would be obvious to one of ordinary skill in the art that the map is used to accurately recognize a vehicle position and is not viewed by the consumer.

The map using car 300 may determine a current position based on the multichannel map. In detail, the map using car 300 may request the server 200 for map data containing the current position and receive corresponding multichannel map data from the server 200. In addition, the map using car 300 may acquire point cloud information for each channel of a surrounding ground at the current position of the car 300 using the multichannel LiDAR sensor.

For example, the map using car 300 may acquire point cloud information for each channel of a ground while rotating by 360 degrees the multichannel LiDAR sensor that installed on the map using car 300 towards the ground, without being limited thereto.

Accordingly, the map using car 300 may match the multichannel map data received from the server 200 and the point cloud information on the ground, acquired through the multichannel LiDAR sensor and determine a current position of the map using car 300 on the multichannel map.

As such, a map may be generated using the multichannel LiDAR sensor so as to generate a detailed map containing a texture of materials (e.g., a lane or a packaging material) constituting the ground (e.g., a road surface) and an accurate position of a vehicle may be determined on the generated detailed map so as to more accurately determine a position of the vehicle. Accordingly, autonomous driving of a vehicle may become easier.

Hereinafter, generation of a map, i.e., a detailed map by the server 200 will be described with reference to FIGS. 2, 3A, 3B, 4A, 4B, 4C, 5A, 5B, 6A, 6B, 7A, and 7B with regard to various embodiments of the present disclosure.

Figure 2:
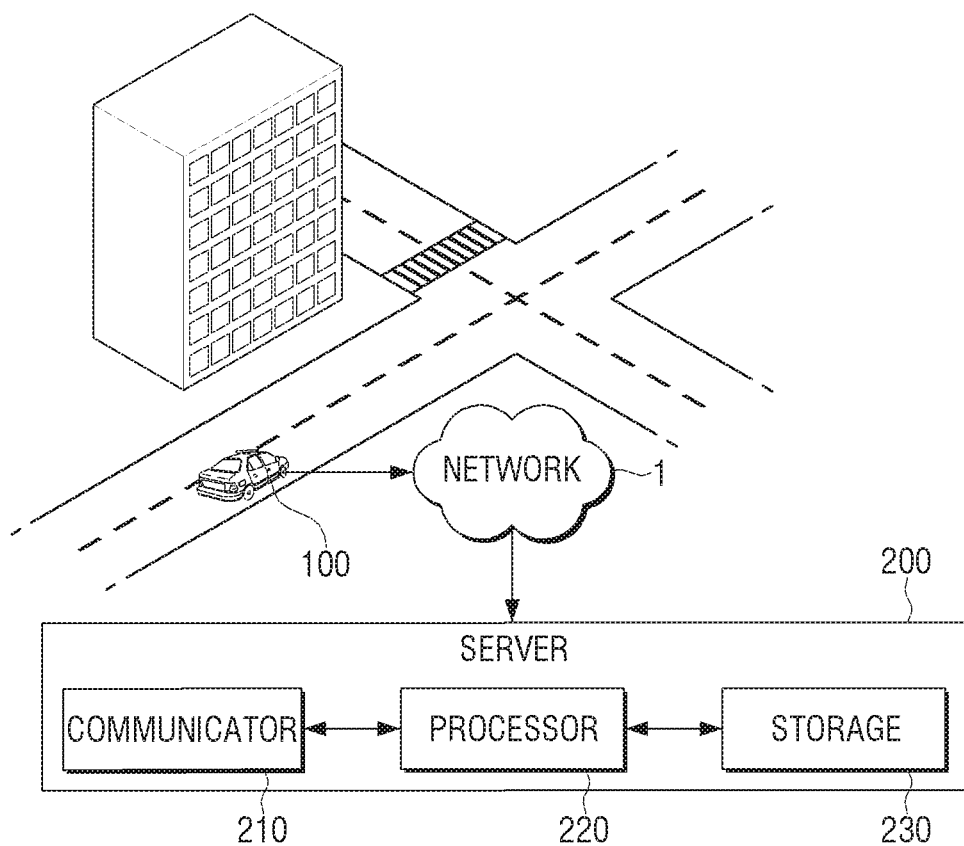
FIG. 2 is a diagram illustrating an example of a map generating environment according to an embodiment of the present disclosure.

FIG. 2 is a diagram illustrating an example of a map generating environment according to an embodiment of the present disclosure.

Referring to FIG. 2, the map generating car 100 may collect information for generating a map, i.e., a detailed map. In detail, the map generating car 100 may acquire the point cloud information for each channel of a surrounding road (a paved road in the example of FIG. 2) of the map generating car 100 using the installed multichannel LiDAR sensor and transmit the point cloud information to the server 200. To this end, the map generating car 100 may be connected to the server 200 through a network 1 such as the Internet.

When the map generating car 100 transmits the point cloud information on the ground, the server 200 may receive the point cloud information, generate a map, and store the generated map. To this end, the server 200 may include a communicator 210, a processor 220, and a storage 230.

In detail, the communicator 210 may be connected to the network 1 and may communicate with an external vehicle via various wired and wireless communication methods. In detail, the communicator 210 may communicate with an external vehicle using a distant communication module or a local area communication module. When the distant communication module is used, the communicator 210 may communicate with a vehicle according to communication standard such as Institute of Electrical and Electronics Engineers (IEEE), 3rd generation (3G), 3G partnership project (3GPP), long term evolution (LTE), and global positioning system (GPS). When the local area communication module is used, the communicator 210 may communicate with a vehicle according to communication standard such as Wi-Fi, Bluetooth, near field communication (NFC), ZigBee, and Picocast. In particular, the communicator 210 may receive the point cloud information for each channel for the ground, which is acquired and transmitted by the map generating car 100.

The processor 220 may control an overall operation of the server 200. In particular, the processor 220 may apply various map generating algorithms to the point cloud information for each channel, received through the communicator 210, to generate a multichannel map and store the generated multichannel map in the storage 230. In addition, according to an embodiment of the present disclosure, the processor 220 may synthesize the received point cloud information for each channel into single-channel point cloud information and apply a map generating algorithm to the synthesized single-channel point cloud information to generate a single-channel.

As described later, the processor 220 may remove influence of ambient light from the point cloud information for each channel, acquired by the map generating car 100, and generate the aforementioned multichannel map or single-channel map.

The generated map data may be stored in the storage 230. As described later, the map data may be transmitted to the map using car 300 according to transmission request of the map data of the map using car 300.

A method of selecting a frequency used for each channel of a multichannel LiDAR sensor will be described with reference to FIGS. 3A and 3B.

Figure 3A:
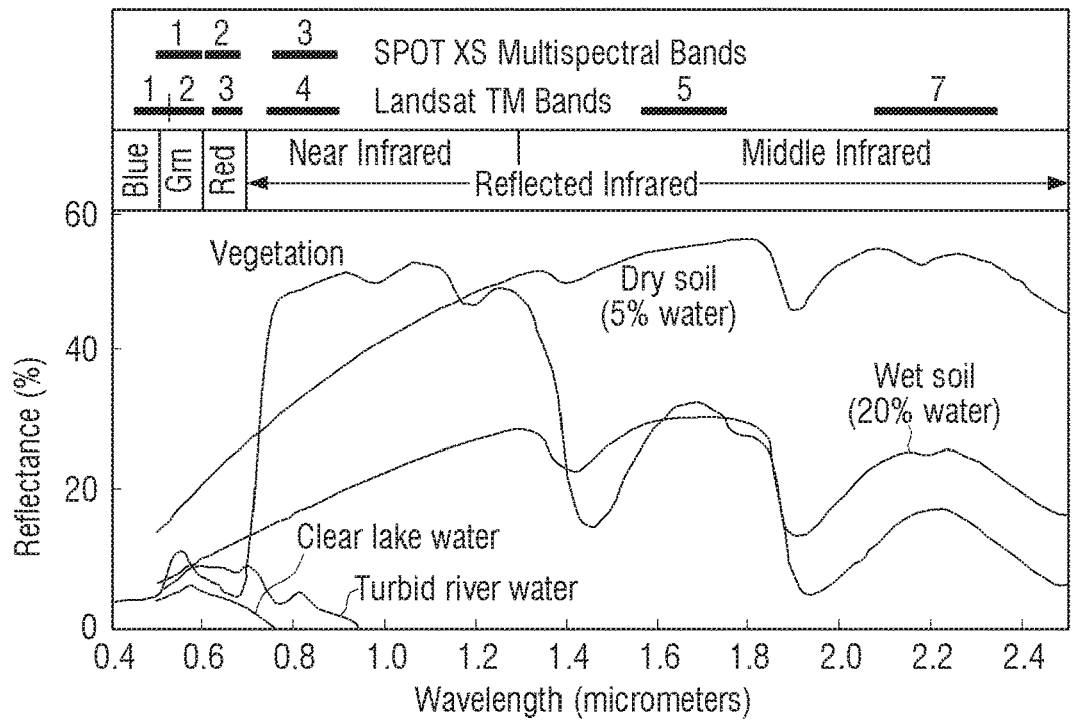
FIGS. 3A and 3B are diagrams illustrating an example of a reflectivity of each material type according to a wavelength of an electromagnetic wave according to various embodiments of the present disclosure.
Figure 3B:
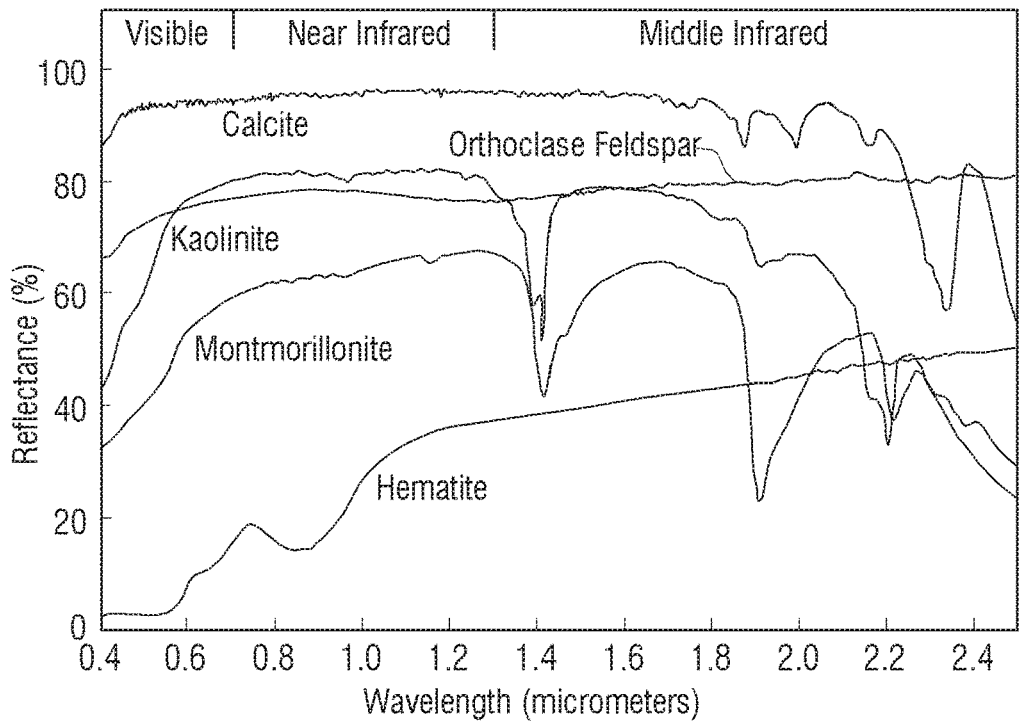

FIGS. 3A and 3B are diagrams illustrating an example of a reflectivity of each material type according to a wavelength of an electromagnetic wave according to various embodiments of the present disclosure.

In detail, FIG. 3A shows reflectivity according to a wavelength of an electromagnetic wave for each type of a surface such as vegetation, dry soil, wet soil, clear lake water, and turbid river water.

FIG. 3B shows reflectivity according to a wavelength of an electromagnetic wave for each type of a mineral such as calcite, kaolinite, hematite, and montmorillonite.

Referring to FIGS. 3A and 3B, reflectivity of an electromagnetic wave may be varied according to a type of a surface or mineral.

When materials have the same reflectivity in a specific wavelength, the materials are not capable of being distinguished through a laser with a frequency of the wavelength. That is, as a reflectivity difference between materials in a predetermined wavelength is larger, the materials may be easily distinguished via laser with the frequency of the wavelength.

Thus, when a laser frequency of each channel of a multichannel LiDAR sensor is selected, a frequency with a large reflectivity difference between the materials constituting the ground may be selected.

For example, in order to configure a 3-channel LiDAR sensor, a wavelength of FIG. 3A may be classified into three regions (0.4 to 1.0 micrometer periods, 1.0 to 1.6 micrometer periods, and 1.6 to 2.2 micrometer periods), variance of reflectivity values of surface types for respective wavelengths of an electromagnetic wave may be calculated for each of the three regions, and then wavelengths with a highest variance value may be selected. Reciprocals of the three selected wavelengths may be frequencies of a laser of each channel of the 3-channel LiDAR sensor.

In addition, for example, in order to configure a 4-channel LiDAR sensor, a wavelength of FIG. 3B may be classified into four regions, standard deviation of reflectivity values of minerals for respective wavelengths may be calculated for each of the four regions, and then wavelengths with a highest standard deviation value may be selected so as to configure each channel layer frequency of the 4-channel LiDAR sensor.

However, an example of selecting a multichannel frequency is not limited thereto. For example, the number of channels may be two or five or more. In addition, reflectivity data according to a frequency (or a wavelength) of materials is not necessarily divided into the number of channels, and thus, for example, a reflectivity difference (e.g., variance) between materials may be calculated for all frequencies, and then frequencies may be selected by as much as the number of channels in an order from a highest difference.

A laser of the selected frequency may be used in a multichannel LiDAR sensor so as to clearly distinguish materials constituting the ground, and accordingly, it may be possible to generate a more detailed map and to accurately determine a position of a vehicle on the map.

Figure 4A:
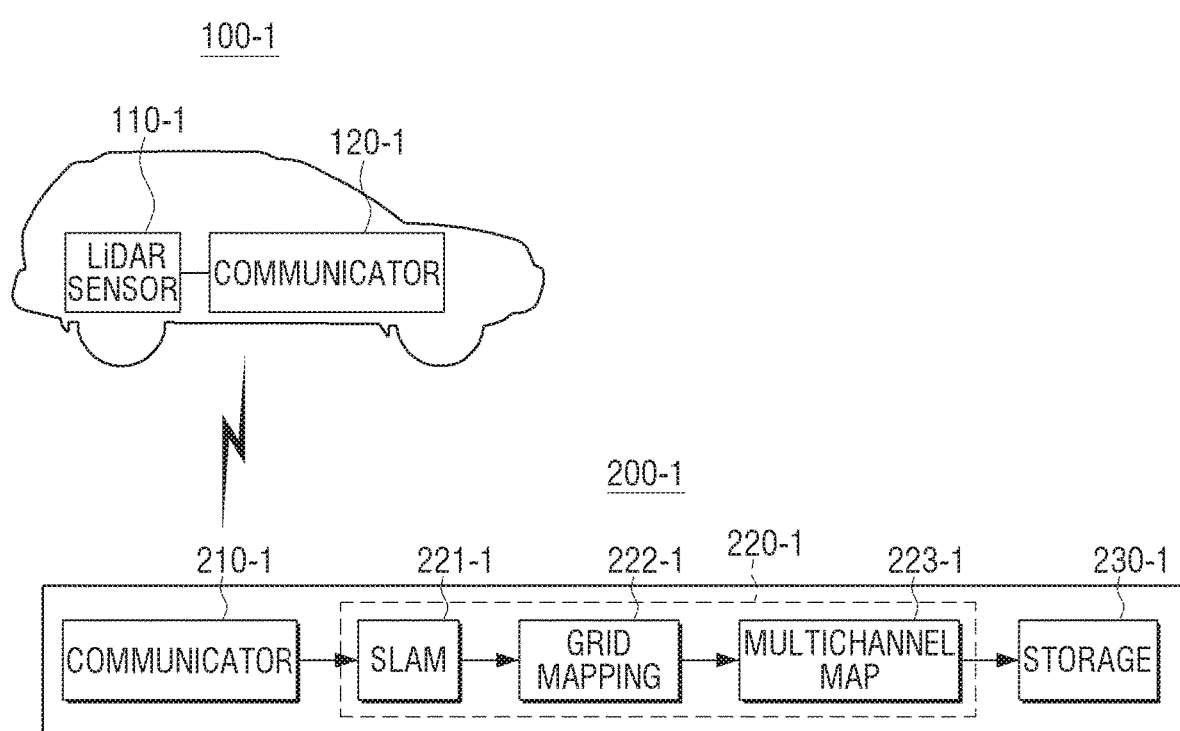
FIGS. 4A, 4B, 4C, 5A, and 5B are diagrams illustrating procedures in which a server generates a map according to various embodiments of the present disclosure.
Figure 4B:
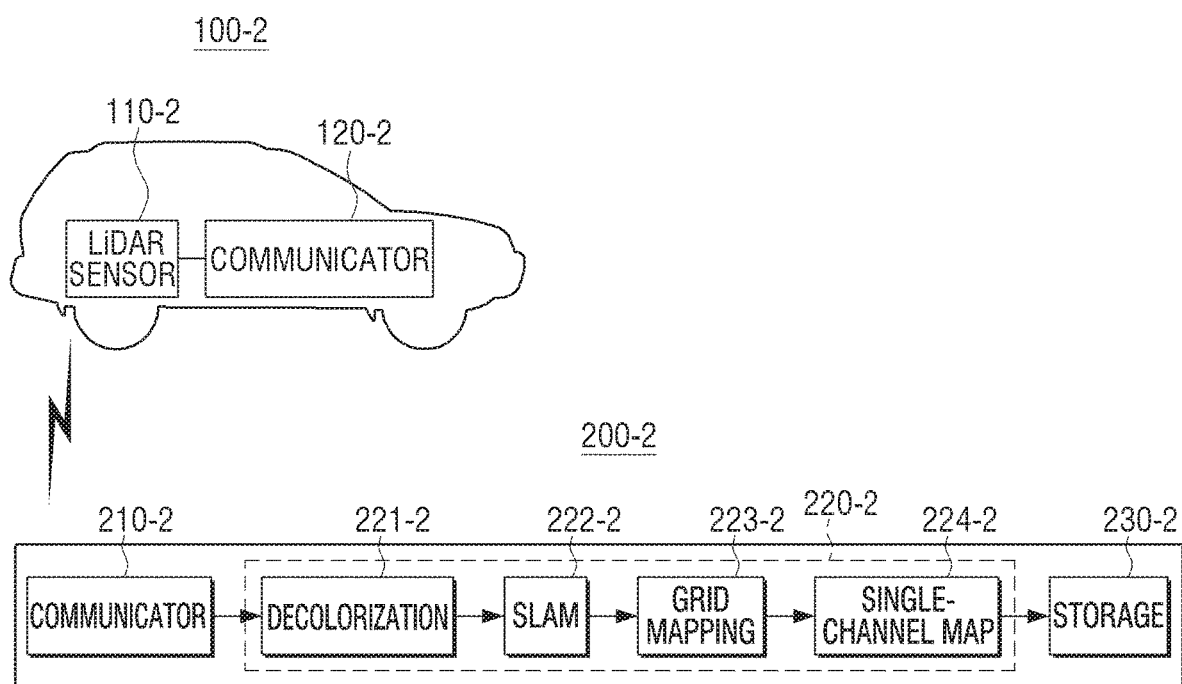
Figure 4C:
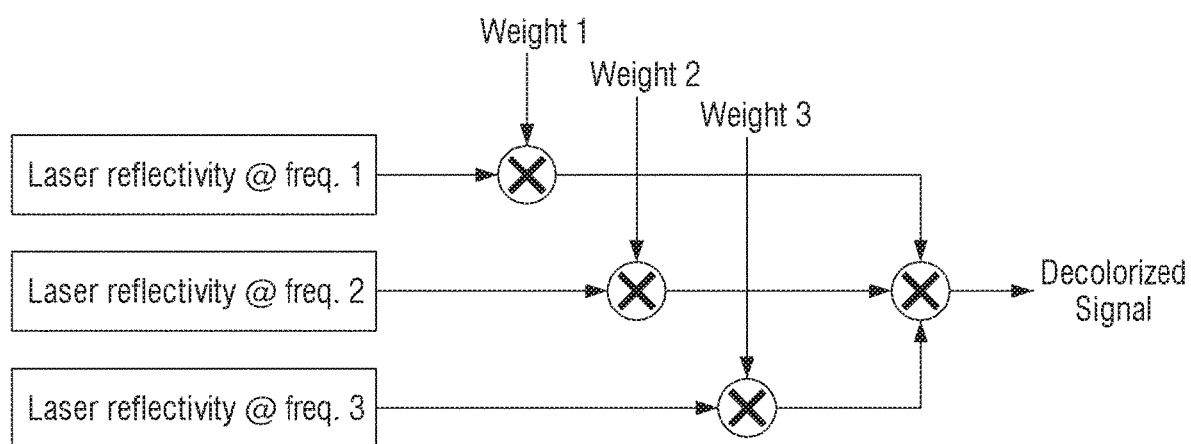

FIGS. 4A, 4B, and 4C are diagrams illustrating an example of a procedure of generating a map by servers 200-1 and 200-2 according to various embodiments of the present disclosure.

FIG. 4A is a diagram illustrating an example of generation of a multichannel map.

Referring to FIG. 4A, a map generating car 100-1 may include a LiDAR sensor 110-1 and a communicator 120-1. Basic components of a car, constituting the map generating car 100-1, for example, a steering device, an acceleration device, a deceleration device, a door, and an electronic control unit (ECU) are not related to the essence of the embodiments of the disclosure and, thus, will not be illustrated or described.

The LiDAR sensor 110-1 may acquire point cloud information on a surrounding ground of the map generating car 100-1 using a multichannel laser. In this case, the point cloud information may include poser information and reflectivity information of each sampling point of the ground.

To this end, the LiDAR sensor 110-1 may include a laser transmitter (not shown) and a laser receiver (not shown) for each channel. In addition, the LiDAR sensor 110-1 may be installed at an appropriate position for scanning of the surrounding ground of the vehicle, for example, at an upper end portion of the map generating car 100-1 so as to emit a laser beam toward the ground, without being limited thereto.

The communicator 120-1 may communicate with an external device. In detail, the communicator 120-1 may communicate with the external device (e.g., a cloud server) 200-1 positioned outside the map generating car 100-1 using a distant communication module or a local area communication module. When the distant communication module is used, the communicator 120-1 may communicate with the server 200-1 according to communication standard such as IEEE, 3G, 3GPP, LTE, and GPS. When the local area communication module is used, the communicator 120-1 may communicate with the server 200-1 according to communication standard such as Wi-Fi, Bluetooth, NFC, ZigBee, and Picocast. In particular, the communicator 120-1 may transmit the point cloud information for each channel, acquired through the LiDAR sensor 110-1, to the server 200-1.

In response to the point cloud information for each channel being received from the map generating car 100-1 through a communicator 210-1, the server 200-1 may generate a multichannel map using the received information and the multichannel map in a storage 230-1.

In detail, a processor 220-1 may apply a simultaneous localization and mapping (SLAM) algorithm to the point cloud information for each channel, received through the communicator 210-1. The point cloud information for each channel, which is acquired with respect to the ground by the map generating car 100-1 through the SLAM 221-1 algorithm, may be optimized so as to estimate pose information. In this case, the pose information may include x and y coordinates and direction information on a map to be generated.

Sensor information is present in each estimated pose information item and, thus, the processor 220-1 may back-project sensor information for each pose and perform grid mapping 222-1. As the result of the grid mapping 222-1, a multichannel map 223-1 may be generated.

In this case, the generated multichannel map 223-1 may be a multichannel 2D reflectivity map containing channels corresponding to respective channels of the multichannel LiDAR sensor 110-1 installed in the map generating car 100-1. In detail, the multichannel map 223-1 may include pixel-unit reflectivity information for each channel and may be a detailed map containing a lane position or texture information of a road on which the map generating car 100-1 drives. The processor 220-1 may store the aforementioned generated multichannel map 223-1 in the storage 230-1.

The reflectivity of a road surface may be changed according to time and, thus, according to an embodiment of the present disclosure, the processor 220-1 may store a mean value or variance of reflectivity in the multichannel map.

In detail, the map generating car 100-1 may drive on the same road a plurality of numbers of times and transmit point cloud information for each of a plurality of channels with respect to the same point to the server 200-1, and the server 200-1 may store a mean or variance value together for each channel in the multichannel map.

FIG. 4B illustrates a procedure of generating a single-channel map by the server 200-2 according to an embodiment of the present disclosure. A map generating car 100-2 of FIG. 4B is generally the same as the map generating car 100-1 of FIG. 4A.

In response to point cloud information for each channel being received from the map generating car 100-2 through a communicator 210-2, the server 200-2 may generate a single-channel map using the received information and store the single-channel map in a storage 230-2.

In detail, in response to the point cloud information for each channel being received through the communicator 210-2, a processor 220-2 may synthesize the point cloud information for each channel into one channel. In FIG. 4B, decolorization 221-2 may refer to such processing by the processor 220-2, that is, an operation of synthesizing multichannel point cloud information into single-channel point cloud information.

According to an embodiment of the present disclosure, the processor 220-2 may multiply each channel constituting a multichannel by a fixed weight to synthesize one channel. For example, in the case of point cloud information received through a 4-channel LiDAR sensor, point cloud information items for respective channels may be multiplied by a weight of 25% and summed to synthesize single-channel point cloud information.

However, just because information is acquired through N channels does not mean each channel needs to be multiplied by a weight of 1/N. For example, in the case of point cloud information received through a 3-channel LiDAR sensor, the processor 220-2 may multiply information acquired through respective channels by fixed weights, and for example, multiply information acquired through a first channel by 20%, multiply information acquired through a second channel by 30%, and multiply information acquired through a third channel by 50%, and sum the results to synthesize single-channel point cloud information.

In this case, according to an embodiment of the present disclosure, as described above, when a frequency of each channel constituting a multichannel is selected, a channel with a large reflectivity difference between materials may be multiplied by a high weight. That is, in the above example, a reflectivity difference between materials in a frequency of a third channel may be largest and a reflectivity difference between materials in a frequency of a first channel may be smallest. That is, for example, the processor 220-2 may calculate variance or standard deviation for each channel of the point cloud information for each channel and multiply a channel with a greater calculated variance value or standard deviation by a greater weight.

According to another embodiment of the present disclosure, the processor 220-2 may adaptively change a weight for each scan of a multichannel LiDAR sensor 110-2 and multiply each channel by a weight to synthesize single-channel point cloud information. Here, the scan may be information acquired during one operation of the LiDAR sensor 110-2, and for example, may be point cloud information acquired during one rotation, i.e., 360° of the LiDAR sensor 110-2, or ⅓ rotation, i.e., 120°, without being limited thereto.

For example, the processor 220-2 may calculate variance values of channel information items for respective scans, normalize the channel information items by as much as the variance values, and then sum the normalized channel information items to synthesize single-channel point cloud information. However, embodiments of the present disclosure are not limited thereto and, thus, the processor 220-2 may calculate variance or standard deviation values of reflectivity information contained in point cloud information for each channel for respective scans and multiply a channel with a greater calculated variance or standard deviation value by a higher weight to synthesize single-channel point cloud information.

FIG. 4C is a diagram illustrating a concept of an example in which the processor 220-2 performs the decolorization 221-2 as described above when 3-channel point cloud information is received through the communicator 210-2. Weights 1 to 3 to be multiplied to each channel information item may be fixed or may be adaptively changed for each scan, as described above.

Thus far, when a channel is multiplied by a weight, this means that reflectivity information for each channel contained in the point cloud information for each channel is multiplied by a weight, without being limited thereto.

Thus, when multichannel point cloud information is synthesized into single-channel point cloud information, as illustrated in FIG. 4B, the processor 220-2 may apply an SLAM 222-2 algorithm to single-channel point cloud information and perform grid mapping 223-2 to generate a map, and in this case, the generated map may be a single-channel map 224-2. The processor 220-2 may store the generated single-channel map 224-2 in the storage 230-2.

Referring to FIG. 4B, the example in which the processor 220-2 of the server 200-2 performs the decolorization 221-2 has been described thus far, embodiments of the present disclosure are not limited thereto.

For example, a processor (not shown) included in the map generating car 100-2 may perform decolorization on the point cloud information for each channel, acquired through the multichannel LiDAR sensor 110-2, as described above. Accordingly, when the point cloud information for each channel is synthesized into single-channel point cloud information, the map generating car 100-2 may transmit the synthesized single-channel point cloud information to the server 200-2 through a communicator 120-2.

Accordingly, the server 200-2 may receive single-channel point cloud information from the map generating car 100-2 through the communicator 210-2, apply the SLAM 222-2 algorithm to the received single-channel point cloud information, and perform the grid mapping 223-2 to generate the single-channel map 224-2. In this case, the processor 220-2 of the server 200-2 may not necessarily perform the decolorization 221-2 separately.

Figure 5A:
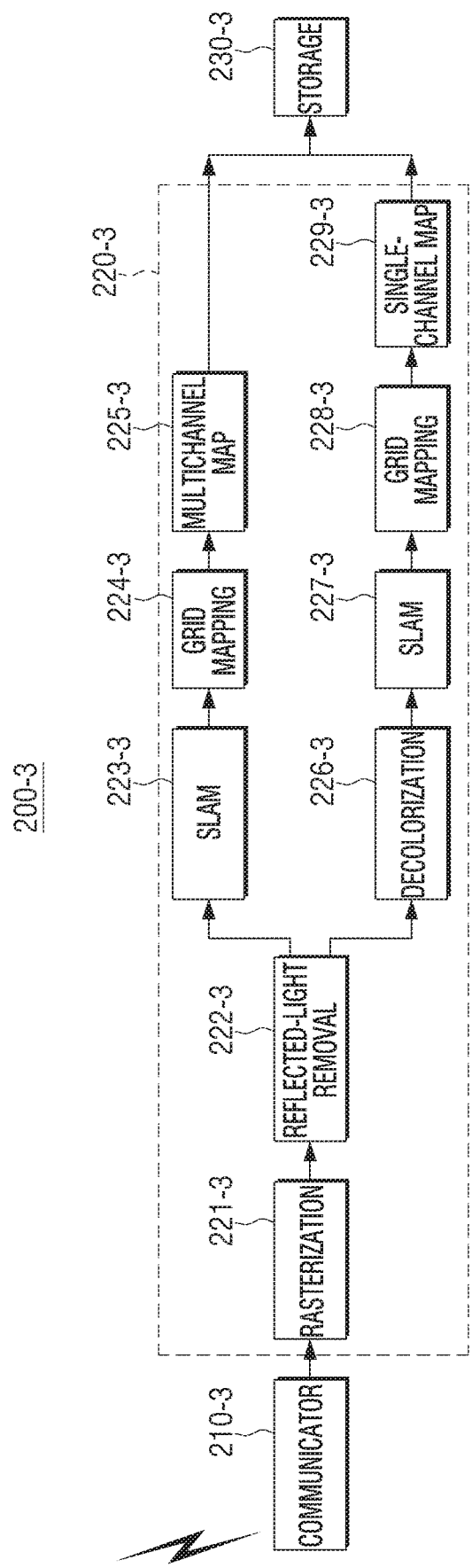
Figure 5B:
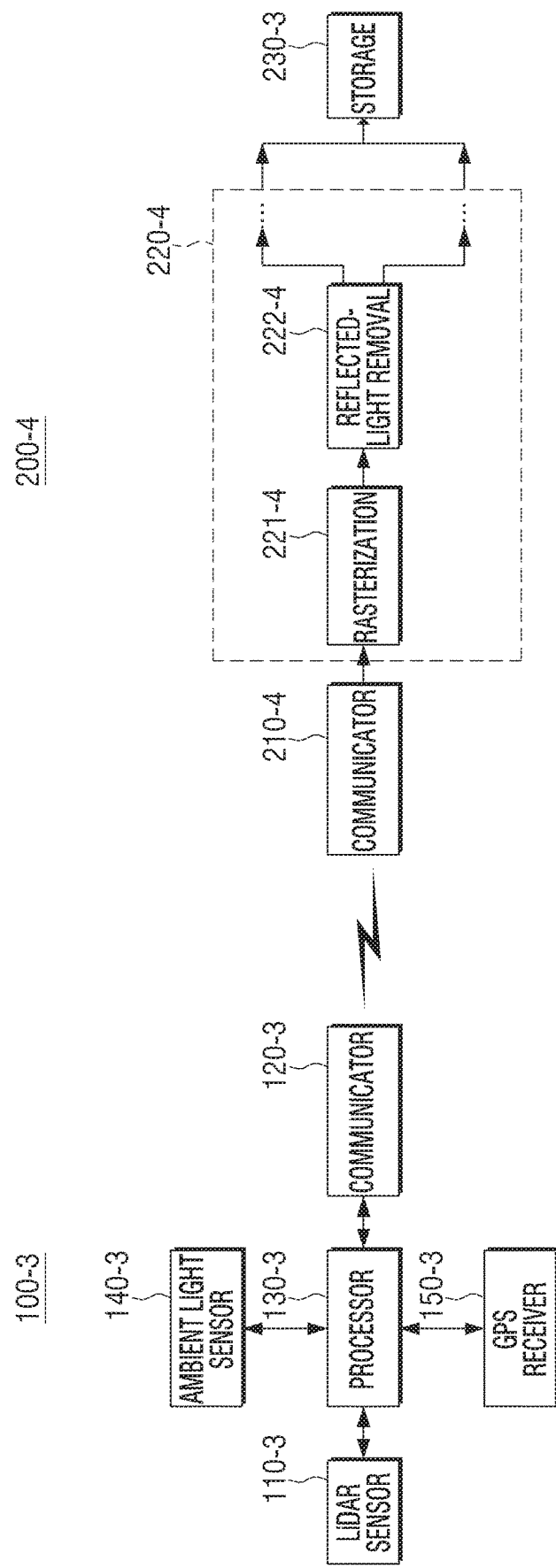

FIGS. 5A and 5B are diagrams illustrating an example of a procedure in which servers 200-3 and 200-4 remove reflected light from multichannel point cloud information and generates a map according to various embodiments of the present disclosure. Here, the reflected light may be obtained by reflecting light of a light source, for example, the sun or a streetlamp and may distort LiDAR sensor information, thereby degrading accuracy of map generation or position recognition. That is, since a LiDAR sensor 110 of the map generating car 100 may scan a surrounding ground of the car 100 to acquire multichannel point cloud information, in this case, reflected light reflected by the surrounding ground may distort information acquired through the LiDAR sensor 110. Accordingly, it may be necessary to remove influence of the reflected light from information acquired through the LiDAR sensor 110.

According to an embodiment of the present disclosure, referring to FIG. 5A, in response to multichannel point cloud information being received through a communicator 210-3, a processor 220-3 of the server 200-3 may perform rasterization 221-3 on the received multichannel point cloud information to acquire 2D data. Since the point cloud information acquired through the LiDAR sensor is three-dimensional (3D) information, it may be necessary to convert 3D information into 2D information in order to remove reflected light. Accordingly, the processor 220-3 may rasterize 3D information for each channel to 2D information for each channel.

Accordingly, the processor 220-3 may perform reflected-light removal 222-3 from the rasterized 2D data for each channel. In detail, the processor 220-3 may apply various algorithms for removing reflected light to the 2D data. For example, the processor 220-3 may apply at least one of analyzing methods including color space analysis for specularity removal, image-plane spatial analysis, and video sequence analysis to the rasterized 2D data to perform reflected-light removal.

As such, when reflected light is removed from the 2D data for each channel, the processor 220-3 may apply an SLAM 223-3 algorithm to the 2D data for each channel, from which the reflected light is removed and perform grid mapping 224-3 to generate a multichannel map 225-3 from which influence of the reflected light is removed, as described with reference to FIGS. 4A to 4C.

In some embodiments of the present disclosure, decolorization 226-3 may be performed on the 2D data for each channel, from which reflected light is removed, to synthesize a single-channel, an SLAM 227-3 algorithm may be applied to the single-channel, and grid mapping 228-3 may be performed to generate a single-channel map 229-3 from which influence of reflected light is removed. In this case, according to an embodiment of the present disclosure, when a processor (not shown) included in a map generating car may perform decolorization on the point cloud information for each channel and transmit the point cloud information for each channel to the server 200-3, the processor 220-3 of the server 200-3 may perform the rasterization 221-3 on the single-channel point cloud information received through the communicator 210-3 to perform the reflected-light removal 222-3 and then generate the single-channel map 229-3 through the SLAM 227-3 and the grid mapping 228-3 without needing to re-perform the decolorization 226-3.

As such, the generated multichannel map 225-3 or the single-channel map 229-3 may be stored in a storage 230-3.

FIG. 5B illustrates an example of generation of a map from which influence of reflected light is removed according to an embodiment of the present disclosure.

Referring to FIG. 5B, a map generating car 100-3 may include a LiDAR sensor 110-3, a communicator 120-3, the processor 130-3, an ambient light sensor 140-3, a GPS receiver 150-3, and an inertial sensor (not shown).

The LiDAR sensor 110-3 may transmit a plurality of laser beams with a plurality of frequencies toward a surrounding ground of the map generating car 100-3 during driving of a vehicle (the map generating car 100-3) to acquire multichannel point cloud information on the surrounding ground.

The ambient light sensor 140-3 may detect ambient light of the vehicle. For example, the ambient light sensor 140-3 may detect intensity of sunlight that shines the map generating car 100-3. To this end, the ambient light sensor 140-3 may include various illuminance sensors without being limited thereto. In addition, a position of the vehicle, in which the ambient light sensor 140-3 is installed, may not also be limited to a specific position and, thus, the ambient light sensor 140-3 may be installed at a position so as to experimentally and easily detect intensity of ambient light.

The GPS receiver 150-3 may receive a GPS signal and calculate positional information of the vehicle. In detail, the GPS receiver 150-3 may receive the GPS signal transmitted from a preset number (e.g., three or more) of satellites and calculate current positional information of the vehicle. In some embodiments of the present disclosure, needless to say, the processor 130-3 may calculate a current position of the vehicle based on the received GPS signal.

The inertial sensor (not shown) may determine a progress direction of a vehicle during movement of the vehicle.

The processor 130-3 may determine a position of the sun based on a position of the vehicle. In detail, the processor 130-3 may recognize a current position of the sun on the earth based on information on the current weather and time. In addition, the processor 130-3 may recognize the current position of the vehicle on the earth through the GPS receiver 150-3 and recognize the progress direction of the vehicle through the inertial sensor (not shown) and, thus, may determine the position of the sun based on the position of the vehicle.

For example, the processor 130-3 may determine a current position of the sun, that is, which side the sun is positioned among left, right, front, rear, and central directions of the map generating car 100-3 and generate information on the determined position of the sun.

The processor 130-3 may control the communicator 120-3 to transmit, to the server 200-4, the point cloud information for each channel, acquired through the multichannel LiDAR sensor 110-3, the ambient light information (e.g., information on intensity of sunlight) detected through the ambient light sensor 140-3, and the aforementioned generated information on the position of the sun based on the current position of the vehicle.

In response to information being received from the map generating car 100-3 through a communicator 210-4, the server 200-4 may generate a multichannel map or single-channel map from which reflected light is removed using the received information and store the same in the storage 230-3.

In detail, as described above, a processor 220-4 may perform rasterization 221-4 on the received multichannel point cloud information in order to remove reflected light from the point cloud information for each channel. Then, the processor 220-4 may apply various algorithms for removing reflected light to the rasterized 2D data for each channel to perform reflected-light removal 222-4.

In this case, the processor 220-4 may perform the reflected-light removal 222-4 using at least one of ambient light information and information on a position of the sun, received from the map generating car 100-3.

For example, when intensity of ambient light (e.g., sunlight) is high, the processor 220-4 may increase intensity of the reflected-light removal 222-4, and when the intensity of the ambient light is low, the processor 220-4 may reduce the intensity of the reflected-light removal 222-4. However, an example in which the reflected-light removal 222-4 is performed using ambient light is not limited thereto, and for example, when intensity of sunlight is preset intensity or more, the reflected-light removal 222-4 may be performed, and when the intensity of sunlight is less than present intensity, the reflected-light removal 222-4 may not be performed.

For example, when the sun is positioned at front left of the map generating car 100-3, the possibility that reflected light is present at front left of the map generating car 100-3 is high, and thus, the processor 220-4 may increase the intensity of the reflected-light removal 222-4 in a region corresponding to a front left side of the map generating car 100-3 in the rasterized 2D data for each channel. In this manner, the processor 220-4 may apply information on a position of the sun and perform the reflected-light removal 222-4.

As such, when reflected light is removed from the 2D data for each channel, the processor 220-3 may perform the SLAMs 222-3 and 227-3 and the grid mapping 225-3 and 228-3 to generate the multichannel map 225-3 or the single-channel map 229-3, as described with reference to FIG. 5A. In this case, as described above, in order to generate the single-channel map 229-3, the decolorization 226-3 may be performed by the processor 220-4 of the server 200-4 or the processor 130-3 of the map generating car 100-3.

Figure 6A:
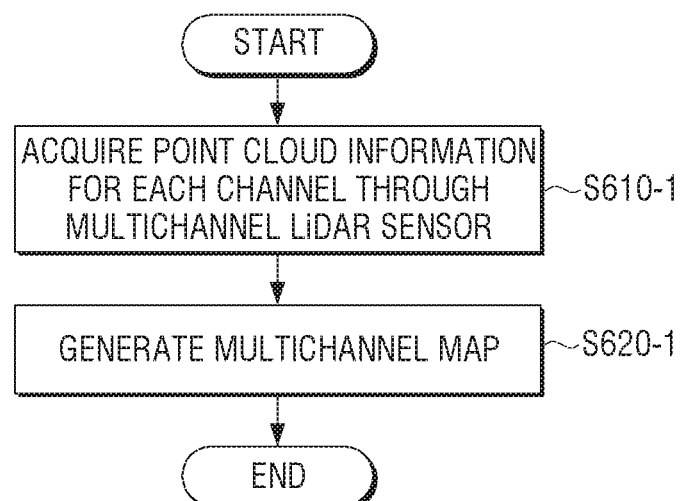
FIGS. 6A, 6B, 7A, and 7B are flowcharts of a map generating method according to various embodiments of the present disclosure.
Figure 6B:
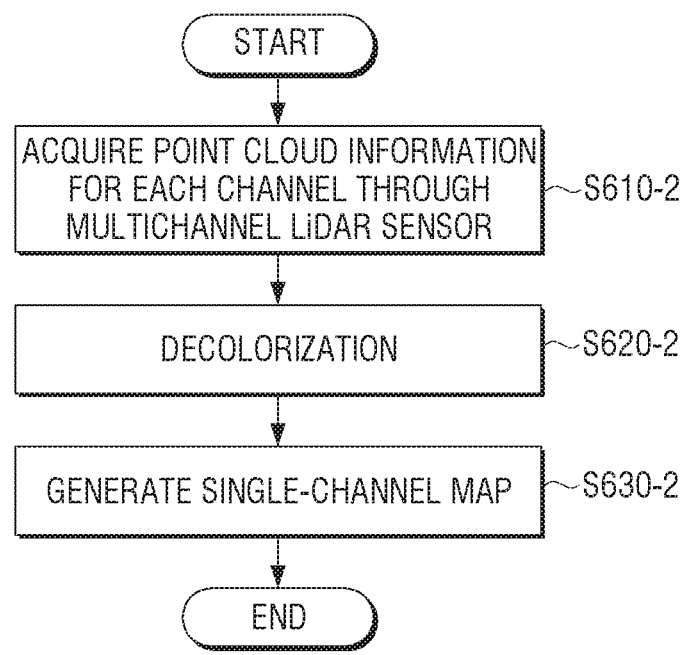

FIGS. 6A and 6B are flowcharts of a method of generating a map according to various embodiments of the present disclosure.

FIG. 6A is a flowchart of a method of generating a multichannel map according to an embodiment of the present disclosure.

Referring to FIG. 6A, the map generating car 100 (illustrated in FIG. 1) may acquire the point cloud information for each channel on the ground through a multichannel LiDAR sensor while driving on a place as a target for generating a multichannel map in operation S610-1.

Accordingly, when the map generating car 100 transmits the point cloud information for each channel to the server 200, the server 200 may generate a multichannel map using the received point cloud information for each channel in operation S610-2. In detail, the server 200 may apply various simultaneous localization and mapping (SLAM) algorithms to the point cloud information for each channel and perform grid mapping to generate a multichannel map of the ground of a corresponding place. As such, the generated multichannel map may be stored in the storage 230 of the server 200 and, then, may be transmitted to the map using car 300 according to a request of the map using car 300.

FIG. 6B is a flowchart of a method of generating a single-channel map according to an embodiment of the present disclosure.

Referring to FIG. 6B, the map generating car 100 (illustrated in FIG. 1) may acquire the point cloud information for each channel on the ground through a multichannel LiDAR sensor while driving on a place as a target for generating a single-channel map in operation S610-2. Accordingly, the map generating car 100 may transmit the acquired point cloud information for each channel to the server 200 (illustrated in FIG. 1).

Accordingly, the server 200 may perform decolorization of multiplying the received point cloud information for each channel by a weight for each channel to synthesize point cloud information of one channel in operation S620-2. In addition, the server 200 may apply a SLAM algorithm to the single-channel point cloud information synthesized through decolorization and perform grid mapping to generate a single-channel map of the ground of a corresponding place in operation S630-2.

According to an embodiment of the present disclosure, decolorization may be performed by the map generating car 100. In detail, the map generating car 100 may multiply the multichannel point cloud information acquired through the multichannel LiDAR sensor by a weight for each channel to synthesize single-channel point cloud information and transmit the synthesized single-channel point cloud information to the server 200.

Accordingly, the server 200 may apply a SLAM algorithm directly to the single-channel point cloud information received from the map generating car 100 and perform grid mapping to generate a single-channel map without needing to perform separate decolorization in operation S620-2.

Figure 7A:
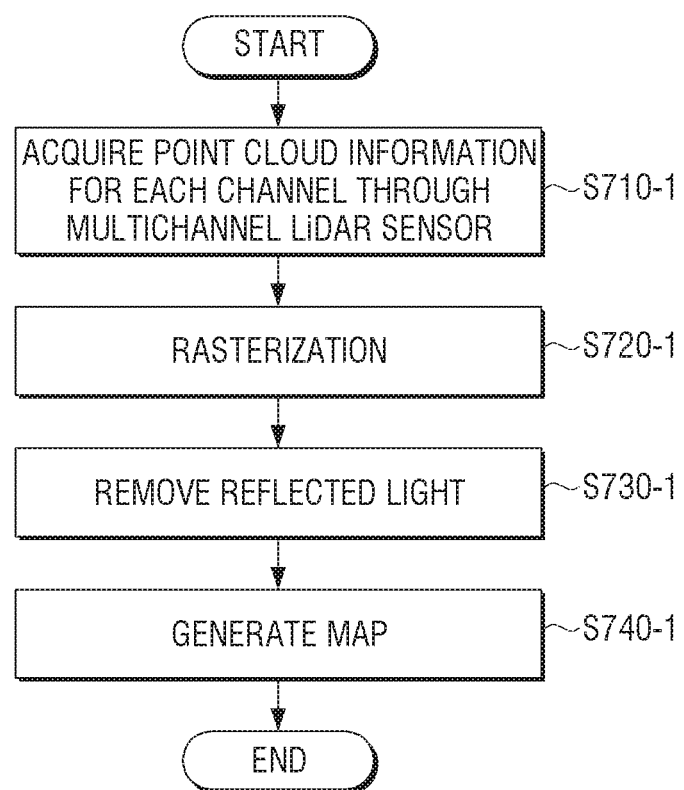
Figure 7B:
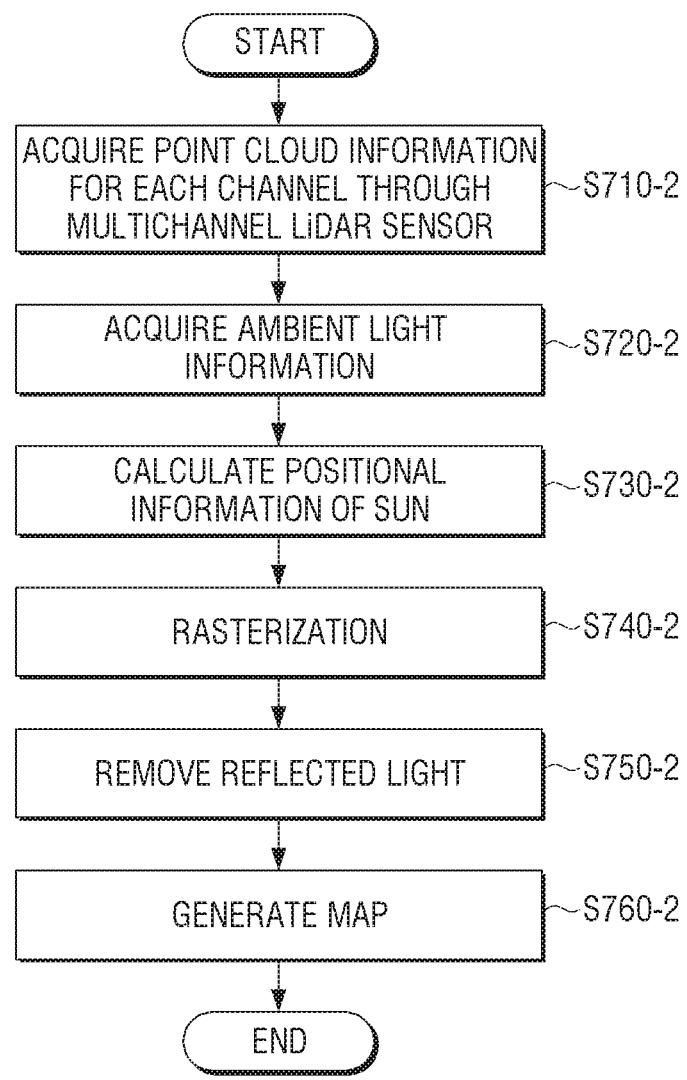

FIGS. 7A and 7B are flowcharts of a method of removing or reducing distortions, such as reflected light from information acquired through a LiDAR sensor and generating a map according to various embodiments of the present disclosure.

Referring to FIG. 7A, the map generating car 100 (illustrated in FIG. 1) may acquire point cloud information for each channel on the ground through the multichannel LiDAR sensor while driving to a place as a target for generating a map in operation S710-1. As such, the acquired multichannel point cloud information may be transmitted to the server 200 (illustrated in FIG. 1) without changes or may be synthesized into single-channel point cloud information via the aforementioned decolorization and transmitted to the server 200.

Since the information acquired through the LiDAR sensor is 3D, it may be necessary to convert the received 3D information into 2D information in order to remove reflected light. Accordingly, the server 200 may perform rasterization on the received multichannel point cloud information or single-channel point cloud information to generate 2D data in operation S720-1.

Accordingly, the server 200 may apply various algorithms for removing or minimizing the reflected light to the rasterized multichannel or single-channel 2D data to perform reflected-light removal or reduction in operation S730-1.

Then, the server 200 may apply an SLAM algorithm to 2D data on which reflected-light removal or reduction is performed and perform grid mapping to generate a multichannel map or a single-channel map of the ground of a corresponding place (S740-1).

FIG. 7B is a flowchart of a method for generating a map from which reflected light is removed according to an embodiment of the present disclosure.

Referring to FIG. 7B, the map generating car 100 (illustrated in FIG. 1) may acquire point cloud information for each channel on the ground through a multichannel LiDAR sensor while driving on a place as a target for generating a map in operation S710-2. In addition, the map generating car 100 may detect intensity of ambient light through an ambient light sensor in operation S720-2. In this case, the ambient light may be sunlight without being limited thereto.

The map generating car 100 may calculate positional information of the sun in operation S730-2. In detail, the map generating car 100 may determine a position of the sun based on a position of the map generating car 100 using information on current weather and time, information on a current position of the map generating car 100 through a GPS receiver, and information on a moving direction of the map generating car 100 through an inertial sensor.

Accordingly, the map generating car 100 may transmit, to the server 200 (illustrated in FIG. 1), the multichannel point cloud information on the ground, ambient light information, and information on a position of the sun based on the position of the map generating car 100.

The server 200 may perform rasterization to the multichannel point cloud information received from the map generating car 100 to generate 2D data in operation S740-2 and apply various algorithms for removing reflected light to the rasterized 2D data in operation S750-2. In this case, the server 200 may adjust intensity of ambient-light removal or reduction by using ambient light information, for example, information on intensity of sunlight. In addition, the server 200 may apply information on a position of the sun when an algorithm for removing or reducing ambient light is applied and perform reflected-light removal.

Accordingly, the server 200 may apply an SLAM algorithm to 2D data from which reflected light is removed and perform grid mapping to generate a map of the ground of a corresponding place in operation 760-2. In this case, the map may be generated as a multichannel map or a single-channel map according to decolorization is further performed in each operation, as described above.

Although the example in which the server 200 generates a map has been described with reference to FIGS. 2, 3A, 3B, 4A, 4B, 4C, 5A, 5B, 6A, 6B, 7A, and 7B, the embodiments of the present disclosure are not limited thereto and, in some embodiments of the present disclosure, the map generating car 100 may directly generate a map using the point cloud information for each channel, acquired through a LiDAR sensor, transmit the generated map to the server 200, and store the same in the server 200.

As described above, the map generated through the server 200 or the map generating car 100 may be a detailed map containing reflectivity information on each point of the ground (e.g., a road surface), may have a slight error of a unit of centimeter compared with an actual ground, and may be used to accurately recognize a position of the map using car 300, which will be described later. Accordingly, autonomous driving may be more easily performed.

Hereinafter, embodiments in which the map using car 300 accurately recognizes a position using a generated map as described above will be described with reference to FIGS. 8, 9, 10A, 10B, 11A, 11B, 12, 13, 14A, 14B, 15A, 15B and 16.

Figure 8:
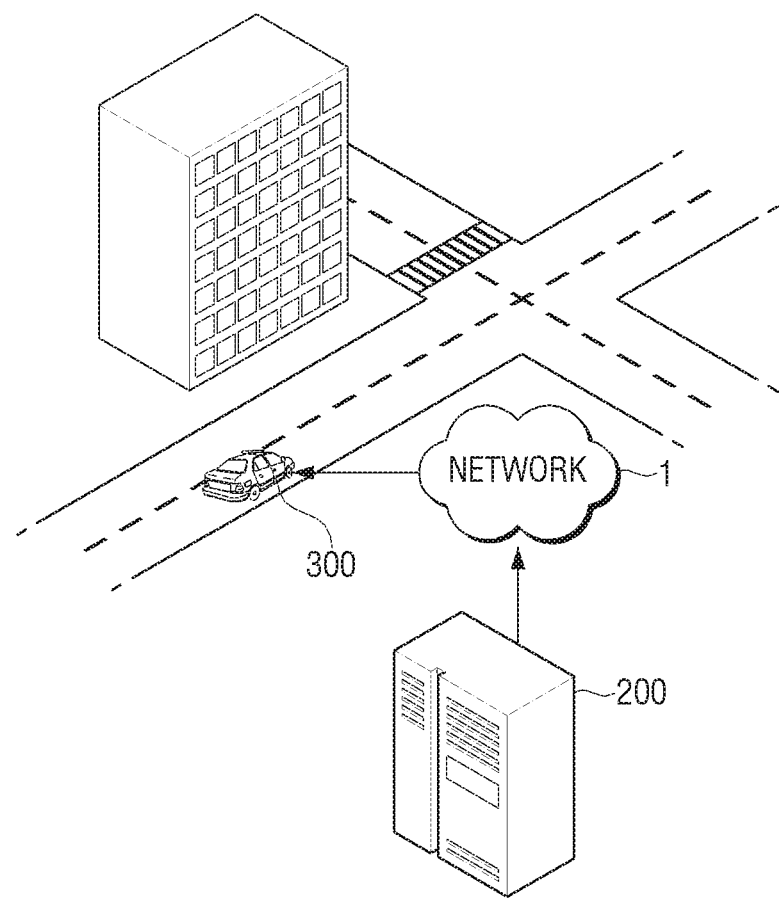
FIG. 8 is a diagram illustrating an example of a position recognition environment of a vehicle according to an embodiment of the present disclosure.

FIG. 8 is a diagram illustrating an example of a position recognition environment of a vehicle according to an embodiment of the present disclosure.

Referring to FIG. 8, the map using car 300 may recognize an accurate position of the map using car 300 in a map based on the map.

In detail, the map using car 300 may be connected to the server 200 through various networks 1 such as the Internet and may receive map data containing a place on which the map using car 300 currently drives from the server 200. In this case, the map data received from the server 200 may refer to map data of the map generated by the server 200 or the map generating car 100, as described above with reference to FIGS. 2, 3A, 3B, 4A, 4B, 4C, 5A, 5B, 6A, 6B, 7A, and 7B.

In addition, the map using car 300 may acquire point cloud information for each channel on a surrounding ground (a paved road in the example of FIG. 8) of the car 300 using a multichannel LiDAR sensor installed in the map using car 300.

Accordingly, the map using car 300 may map the map data received from the server 200 and acquired through the LiDAR sensor to determine a current position of the map using car 300 in the map.

Here, the map using car 300 may be any vehicle that recognizes a position based on the map received through the external server 200 and uses the recognized position as information for autonomous driving.

Figure 9:
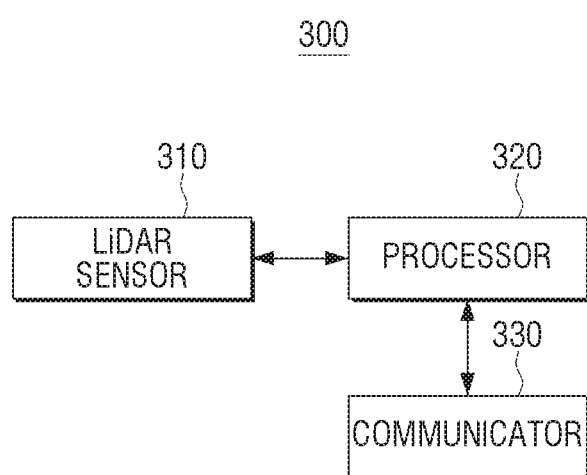
FIG. 9 is a block diagram illustrating a configuration of a map using car according to an embodiment of the present disclosure.

FIG. 9 is a block diagram illustrating a configuration of the map using car 300 according to an embodiment of the present disclosure.

Referring to FIG. 9, the map using car 300 may include a LiDAR sensor 310, a processor 320, and a communicator 330. General basic car components constituting the map using car 300, for example, a steering device, an acceleration device, a deceleration device, a door, and an ECU are not necessarily related to the essence of the embodiments of the disclosure and, thus, such components will not be further illustrated or described.

The LiDAR sensor 310 is the same as the LiDAR sensors 110-1, 110-2, and 110-3 which have been described with reference to FIGS. 2, 3A, 3B, 4A, 4B, 4C, 5A, 5B, 6A, 6B, 7A, and 7B and, thus, a repeated description thereof will not be provided.

However, a frequency for each channel of the LiDAR sensor 310 used in the map using car 300 may be the same as a frequency for each channel of a LiDAR sensor installed in the map generating car 100 used to generate map data received through the communicator 330, as described below.

That is, for example, the map generating car 100 may include a 3-channel LiDAR sensor including a first channel using a laser of a first frequency, a second channel using a laser of a second frequency, and a third channel using a laser of a third frequency and acquire 3-channel point cloud information using the 3-channel LiDAR sensor. As such, when the 3-channel point cloud information is used to generate a 3-channel map or a single-channel map, if the map using car 300 receives the 3-channel map or single-channel map data from the server 200 through the communicator 330, the LiDAR sensor 310 that needs to be included in the map using car 300 in order to recognize a position based on the received map may be a 3-channel LiDAR sensor including a first channel using a laser of a first frequency, a second channel using a laser of a second frequency, and a third frequency using a laser of a third frequency, such as a LiDAR sensor of the map generating car 100.

As such, the LiDAR sensor 310 may acquire point cloud information for each channel on a surrounding ground of the map using car 300 using a multichannel laser.

The communicator 330 may communicate with an external server to transmit and receive various information items. In detail, the communicator 330 may request the external server 200 to transmit map data and receive the map transmitted in response to the request of the external server 200 under control of the processor 320.

To this end, the communicator 330 may be connected to the network 1 via various wired and wireless communication methods and may communicate with the server 200. In detail, the communicator 330 may communicate with the external server 200 using a distant communication module or a local area communication module. When the distant communication module is used, the communicator 330 may communicate with the external server 200 according to communication standard such as IEEE, 3G, 3GPP, LTE, and GPS. When the local area communication module is used, the communicator 330 may communicate with a vehicle according to communication standard such as Wi-Fi, Bluetooth, NFC, ZigBee, and Picocast.

The processor 320 may control an overall operation of the map using car 300. In particular, the processor 320 may control the communicator 330 to receive map data from the external server 200. In addition, the processor 320 may control the LiDAR sensor 310 to acquire multichannel point cloud information on a ground (e.g., a road surface) on which the map using car 300 drives. Accordingly, the processor 320 may determine a position of the map using car 300 in the map received from the external server 200 based on the point cloud information for each channel, acquired through the LiDAR sensor 310.

Hereinafter, various embodiments in which the map using car 300 determines a position of the map using car 300 in the map data received from the server 200 will be described in detail with reference to FIGS. 10A, 10B, 11A, 11B, 12, 13, 14A, and 14B.

Figure 10A:
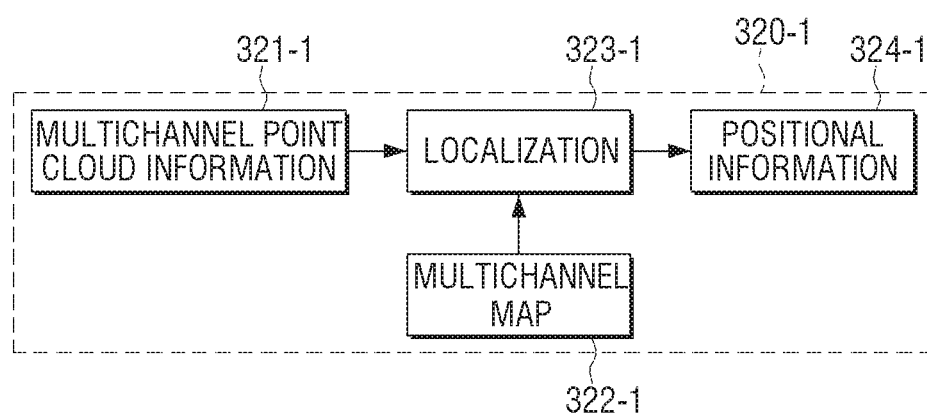
FIGS. 10A, 10B, 11A, and 11B are diagrams illustrating a procedure in which a vehicle determines a position in a map according to various embodiments of the present disclosure.

FIG. 10A illustrates an example in which the map using car 300 determines a position based on a multichannel map according to an embodiment of the present disclosure.

Referring to FIG. 10A, a processor 320-1 of the map using car 300 (illustrated in FIG. 8) may match multichannel map data 322-1 received from the server 200 (illustrated in FIG. 8) through the communicator 330 (illustrated in FIG. 9) and the multichannel point cloud information 321-1 acquired through the LiDAR sensor 310 to determine in operation 323-1 a localized position of the map using car 300 in the multichannel map.

In this case, the multichannel map may be reflectivity information corresponding to the number of channels for each point on a map. That is, for example, in the case of a 3-channel map, a specific point on the map may include three reflectivity information items. The LiDAR sensor 310 also acquires point cloud information for each channel for every scan point and, thus, for example, in the case of a three-channel LiDAR sensor, three-point cloud information items may be acquired for every scan point.

Accordingly, the processor 320-1 may map the multichannel point cloud information acquired through the LiDAR sensor 310 and the multichannel map to determine a current position of the map using car 300 in the multichannel map. In particular, in an embodiment of the present disclosure, a plurality of channel information items is jointed and compared with each other and thus, a position in a map may be more accurately specified.

Accordingly, the processor 320-1 may generate current positional information 324-1 of the map using car 300 in multichannel map data. In this case, the positional information 324-1 may include x and y coordinates and direction information of the map using car 300 in the multichannel map without being limited thereto.

Figure 10B:
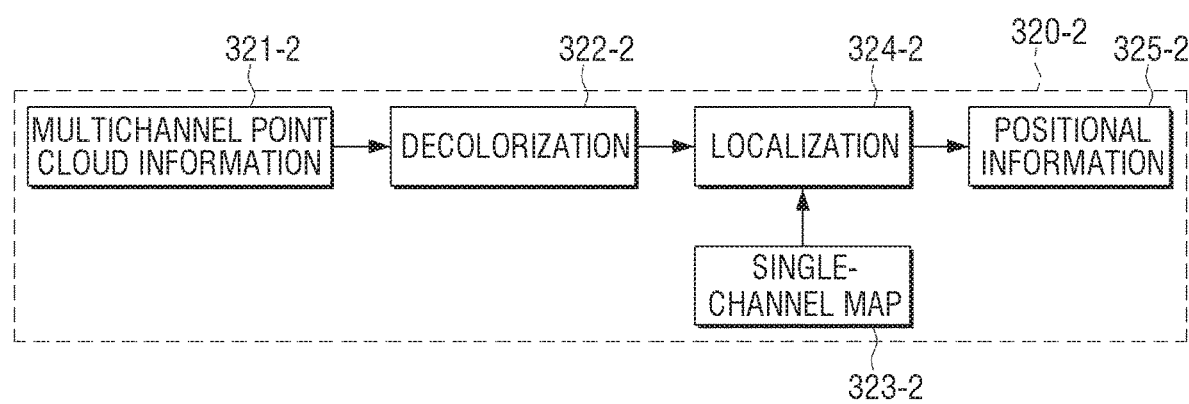

FIG. 10B illustrates an example in which the map using car 300 (illustrated in FIG. 8) determines a position based on a single-channel map according to an embodiment of the present disclosure.

Referring to FIG. 10B, a processor 320-2 of the map using car 300 may determine in operation 324-2 a localized position of the map using car 300 (illustrated in FIG. 8) in the single-channel map data 323-2 using the single-channel map data 323-2 received from the server 200 through the communicator 330 and multichannel point cloud information 321-2 acquired through the LiDAR sensor 310.

In detail, the processor 320-2 may multiply multichannel point cloud information acquired through the LiDAR sensor 310 with a weight for each channel to synthesize single-channel point cloud information. This procedure is referred to as decolorization 322-2. The decolorization 322-2 is the same as in the description of generation of a single-channel map with reference to FIG. 4B and, thus, a repeated description thereof will not be provided.

In this case, when the single-channel map 323-2 is generated by multiplying each channel with a fixed weight, a weight that is multiplied to each channel of the multichannel point cloud information acquired through the LiDAR sensor 310 by the processor 320-2 of the map using car 300 may be the same as a weight applied in a generating procedure of the single-channel map 323-2, without being limited thereto. To this end, the server 200 may also transmit information on a weight applied to a map generating procedure during transmission of the single-channel map 323-2.

Accordingly, the processor 320-2 may match a single-channel map 323-3 and single-channel point cloud information to determine in operation 324-2 a position of the map using car 300 and generate positional information 325-2.

Figure 11A:
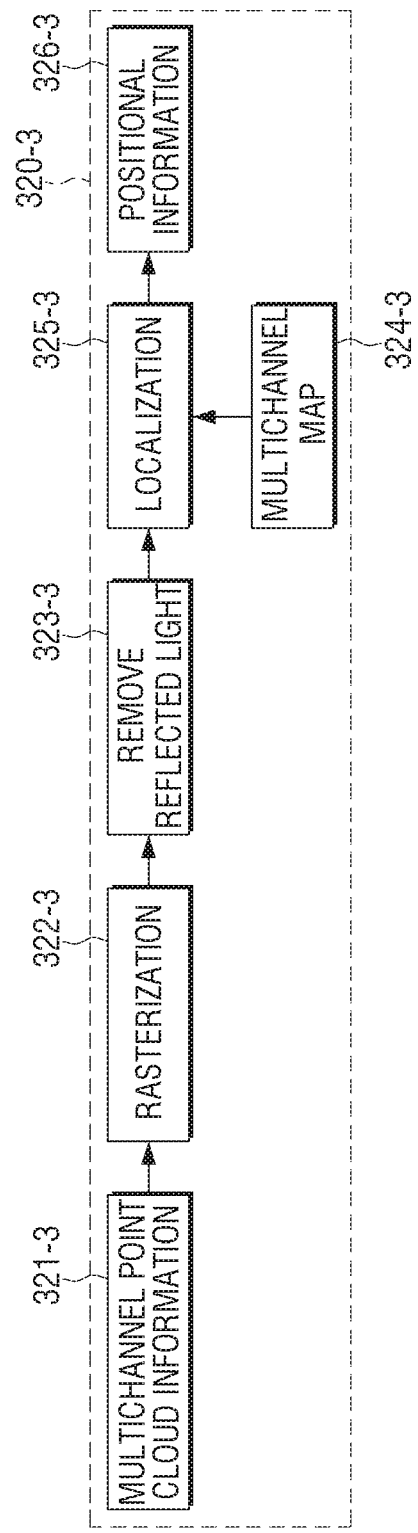
Figure 11B:
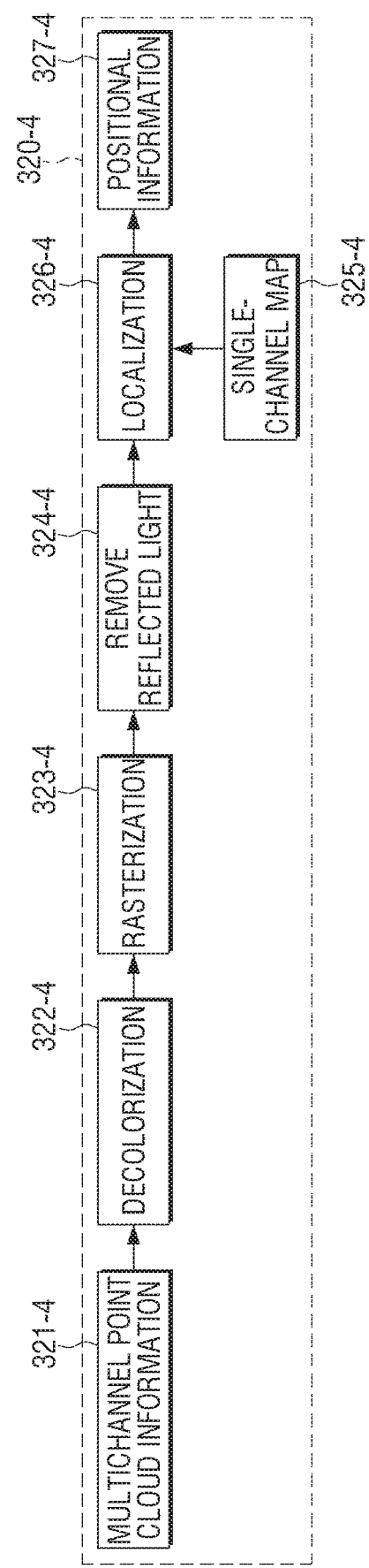

FIGS. 11A and 11B illustrate an operation of the processor 320 that determines a position of the map using car 300 when the map using car 300 (illustrated in FIG. 8) receives a generated map from which reflected light is removed like in the example of FIG. 5A according to an embodiment of the present disclosure.

In detail, FIG. 11A illustrates a case in which the map using car 300 receives a multichannel map 324-3 from which reflected light is removed. In this case, a processor 320-3 may convert multichannel point cloud information 321-3 acquired through the LiDAR sensor 310 into 2D information using rasterization 322-3. Then, the processor 320-3 may apply in operation 323-3 the various algorithms for removing reflected-light described with reference to FIG. 5A to the rasterized 2D information to generate multichannel 2D information from which reflected light is removed and matched to the multichannel 2D information and the multichannel map 324-3 from which reflected light is removed to determine in operation 325-3 a localized position of the map using car 300 in the multichannel map 324-3. Thus, the processor 320-3 may generate positional information 326-3 of the map using car 300.

FIG. 11B illustrates a case in which the map using car 300 (illustrated in FIG. 8) receives a single-channel map 325-4 from which reflected light is removed. In this case, a processor 320-4 may perform decolorization 322-4 on multichannel point cloud information 321-4 acquired through the LiDAR sensor 310 to synthesize single-channel point cloud information. Then, the processor 320-4 may convert the synthesized single-channel point cloud information into 2D information using rasterization 323-4 and apply in operation 324-4 the various algorithms for removing reflected light described with reference to FIG. 5A to the rasterized 2D information to generate 2D information from which reflected light is removed.

Accordingly, the processor 320-4 may match the single-channel map 325-4 from which reflected light is removed and the rasterized 2D information from which reflected light is removed to determine in operation 326-4 a localized position of the map using car 300 in the single-channel map 325-4. Accordingly, the processor 320-4 may generate positional information 327-4 of the map using car 300.

As such, the generated positional information 324-1, 325-2, 326-3, and 327-4 may be used as information for autonomous driving.

Figure 12:
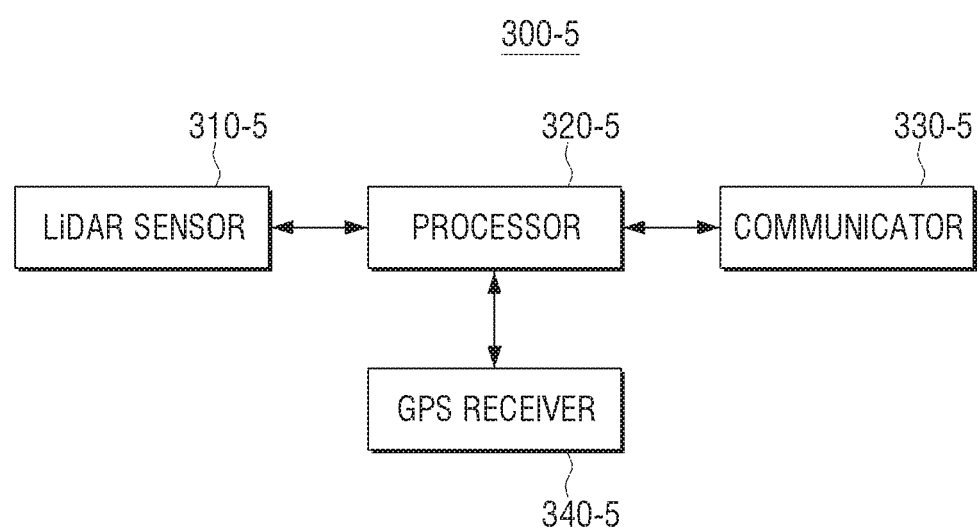
FIG. 12 is a block diagram illustrating components of a vehicle according to an embodiment of the present disclosure.

FIG. 12 is a block diagram illustrating components of a vehicle according to an embodiment of the present disclosure.

Referring to FIG. 12, a map using car 300-5 may include a LiDAR sensor 310-5, a processor 320-5, a communicator 330-5, and a GPS receiver 340-5. As described with reference to FIG. 12, the same components of FIG. 12 as those of the map using car 300 illustrated in FIG. 9 will not be repeatedly described and thus, a repeated description will not be provided.

The GPS receiver 340-5 may receive a GPS signal and determine a position of the map using car 300-5. In detail, the GPS receiver 340-5 may receive a GPS signal from a preset number of external GPS satellites and calculate a position of the map using car 300-5 based on the received GPS signal. In some embodiments of the present disclosure, the processor 320-5 may calculate the position of the map using car 300-5 based on the received GPS signal, needless to say.

According to an embodiment of the present disclosure, the processor 320-5 may primarily determine the position of the map using car 300 in the map data received from the server 200 based on the GPS signal received through the GPS receiver 340-5. Then, the processor 320-5 may secondarily determine the position of the map using car 300-5 using the multichannel point cloud information acquired through the LiDAR sensor 310-5, as described above.

As such, a computational load of the processor 320-5 may be reduced compared with in the case in which a position of the map using car 300-5 is determined using only information acquired through the LiDAR sensor 310-5. That is, the position calculated through the GPS signal has a relatively high error range and, thus, the position of the map using car 300-5 may be primarily determined through the GPS signal, and map data within a preset range (e.g., a general error range for determining a position through the GPS signal) from the position determined through the GPS signal and information acquired through the LiDAR sensor 310-5 to accurately determine the position of the map using car 300-5, thereby reducing a computational load of the processor 320-5 compared with a case in which entire map data received from the server 200 is matched.

According to another embodiment of the present disclosure, the processor 320-5 may request the server 200 (illustrated in FIG. 8) to transmit map data of a region corresponding to a preset range from the position of the map using car 300-5, which is determined using the GPS signal. That is, the processor 320-5 may not request the server 200 to transmit map data of all regions that are stored in the server 200 but may request the server 200 to transmit only map data of a region corresponding to a predetermined range from the position determined through the GPS signal while the map using car 300-5 drives, thereby reducing a computational load of the processor 320-5.

Figure 13:
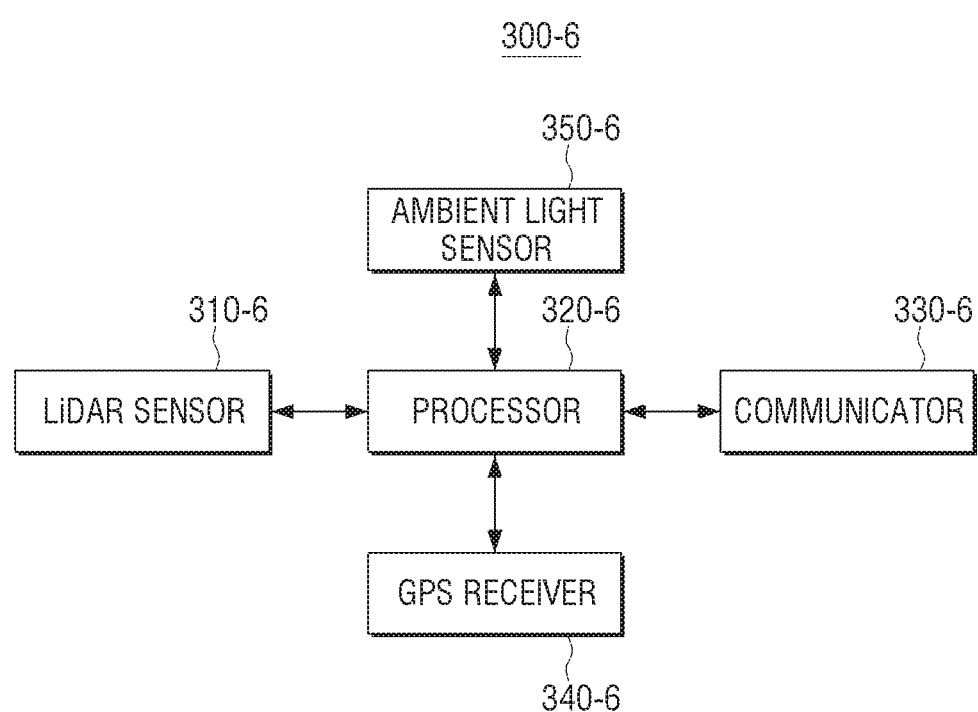
FIG. 13 is a block diagram illustrating components of a map using car according to an embodiment of the present disclosure.

FIG. 13 is a block diagram illustrating components of a map using car 300-6 according to an embodiment of the present disclosure.

Referring to FIG. 13, the map using car 300-6 may include a LiDAR sensor 310-6, a processor 320-6, a single-channel map 327-8 (illustrated in FIG. 14B), a communicator 330-6, a GPS receiver 340-6, and an ambient light sensor 350-6. With regard to a description of FIG. 12, a repeated description of the same components as the map using cars 300 and 300-5 illustrated in FIGS. 9 and 12 will be omitted here.

The ambient light sensor 350-6 may detect ambient light of the map using car 300-6 and provide the detected ambient light information to the processor 320-6. For example, the ambient light sensor 350-6 may detect intensity of sunlight that shines the map using car 300-6 and provide the intensity information of sunlight to the processor 320-6. To this end, the ambient light sensor 350-6 may include various illuminance sensors without being limited thereto.

In addition, the processor 320-6 may determine a position of the map using car 300-6 through a GPS signal received through the GPS receiver 340-6 and determine a position of the sun based on a current time. In addition, although not illustrated, a moving direction of the map using car 300-6 may also be determined through an inertial sensor. Accordingly, the processor 320-6 may determine a position of the sun based on the position of the map using car 300-6. For example, the processor 320-6 may determine a current position of the sun, that is, which side the sun is positioned among left, right, front, rear, and central directions of the map using car 300-6 and generate information on the determined position of the sun.

Figure 14A:
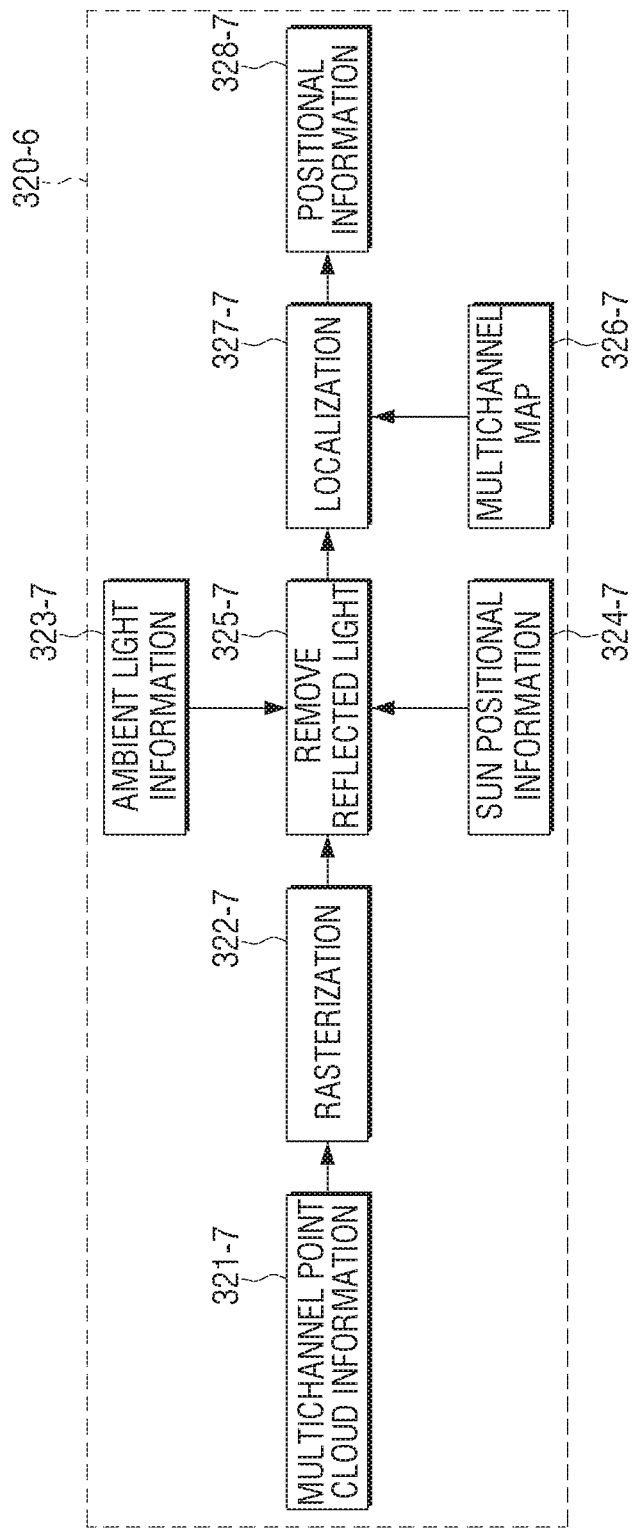
FIGS. 14A and 14B are diagrams illustrating a procedure in which the vehicle of FIG. 13 determines a position in a map according to various embodiments of the present disclosure.

FIG. 14A is a diagram illustrating an example of a procedure in which the map using car 300-6 of FIG. 13 determines a position in a multichannel map 326-7 according to an embodiment of the present disclosure.

Referring to FIG. 14A, the processor 320-6 may perform rasterization 322-7 on multichannel point cloud information 321-7 and apply various algorithms for removing reflected light to the rasterized 2D data for each channel rasterization 322-7 to perform reflected-light removal 325-7.

In this case, the processor 320-6 may perform the reflected-light removal 325-7 using at least one of ambient light information 323-7 acquired through the ambient light sensor 350-6 and determine positional information 324-7 of the sun.

For example, when intensity of ambient light (e.g., sunlight) is high, the processor 320-6 may increase intensity of the reflected-light removal 325-7, and when intensity of ambient light is low, the processor 320-6 may reduce intensity of the reflected-light removal 325-7. However, the embodiments of the present disclosure are not limited to an example in which the reflected-light removal 325-7 is performed using ambient light information. For example, when intensity of sunlight is equal to or more than preset intensity, the reflected-light removal 325-7 may be performed, and the intensity of sunlight is less than preset intensity, the reflected-light removal 325-7 may not be performed.

For example, when the sun is positioned at front left of the map using car 300-6, the possibility that reflected light is present at front left of the map using car 300-6 is high, and thus, the processor 320-6 may increase the intensity of the reflected-light removal 325-7 in a region corresponding to a front left side of the map using car 300-6 in the rasterized 2D data for each channel. In this manner, the processor 320-6 may apply information on a position of the sun and perform the reflected-light removal 325-7.

Accordingly, the processor 320-6 may match the multichannel map 326-7 received through the server 200 through the communicator 330-6 and the rasterized multichannel 2D information from which reflected light is removed to determine in operation 327-7 a position of the map using car 300-6 in the multichannel map 326-7 and generate positional information 328-7.

Figure 14B:
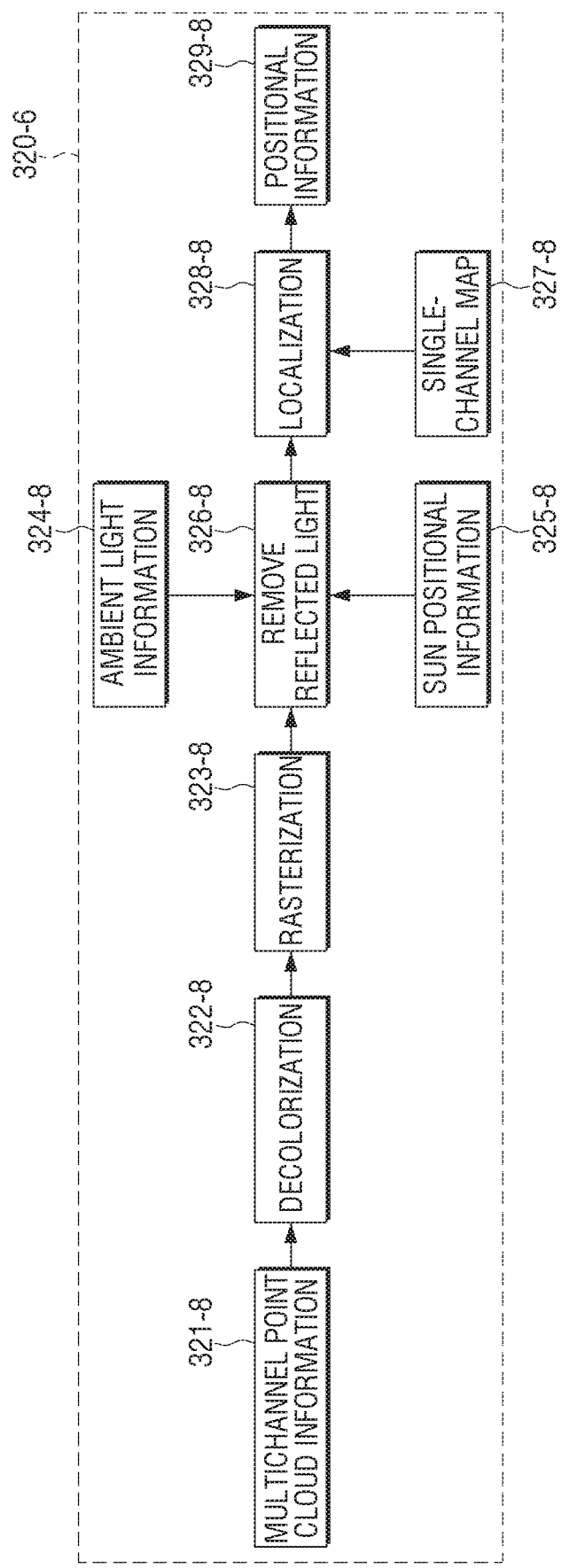

FIG. 14B is a diagram illustrating an example of a procedure in which the map using car 300-6 of FIG. 13 determines a position in a single-channel map 327-8 according to an embodiment of the present disclosure.

Referring to FIG. 14B, in order to determine a position of a map using car in the single-channel map 327-8, the processor 320-6 may first perform decolorization 322-8 on multichannel point cloud information 321-8 acquired through the LiDAR sensor 310-6 to synthesize single-channel point cloud information, perform rasterization 323-8 on the synthesized single-channel point cloud information, and then perform reflected-light removal 326-8 the rasterized single-channel 2D information.

In this case, adjustment of the reflected-light removal 326-8 based on at least one of ambient light information 324-8 and positional information 325-8 of the sun is the same as the above description of FIG. 14A, and the processor 320-6 may match the single-channel map 327-8 and the rasterized single-channel 2D information from which reflected light is removed to determine in operation 328-8 a localized position of the map using car 300-6 in the single-channel map 327-8 and generate positional information 329-8.

It would be obvious to one of skill in the art that the components of the map using cars 300, 300-5, and 300-6 are combined in the various forms. For example, the LiDAR sensor 310, the GPS receiver 340-5, and the ambient light sensor 350-6 may be installed in the map using car 300 and the processor 320 or the communicator 330 may be included in a separate device (e.g., a notebook computer, a smart phone, a personal digital assistant (PDA), and a portable media player (PMP)) connected to the map using car 300.

Figure 15A:
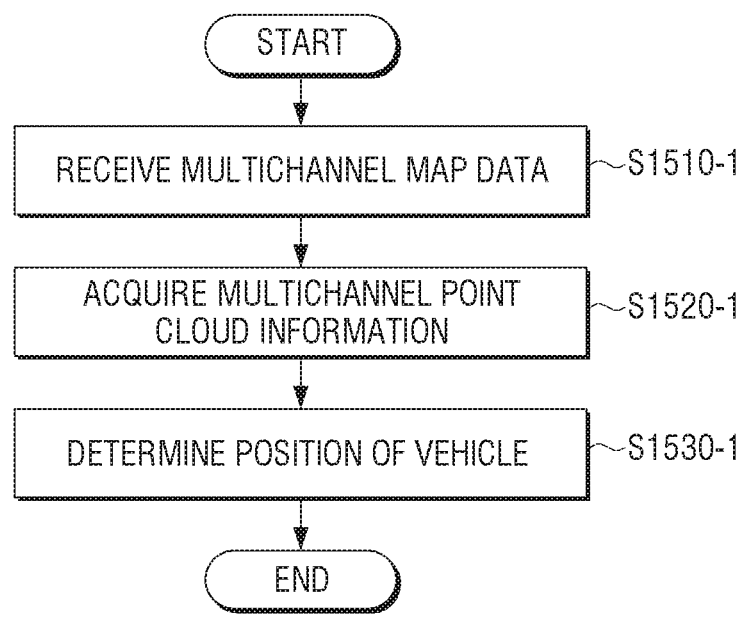
FIGS. 15A, 15B, and 16 are flowcharts of a recognition method based on a map of a vehicle according to various embodiments of the present disclosure.
Figure 15B:
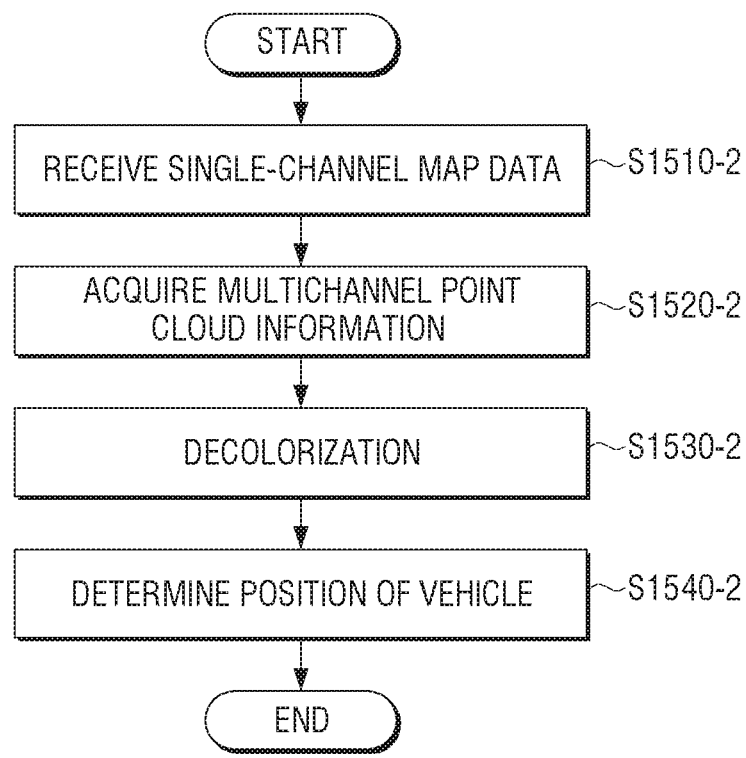
Figure 16:
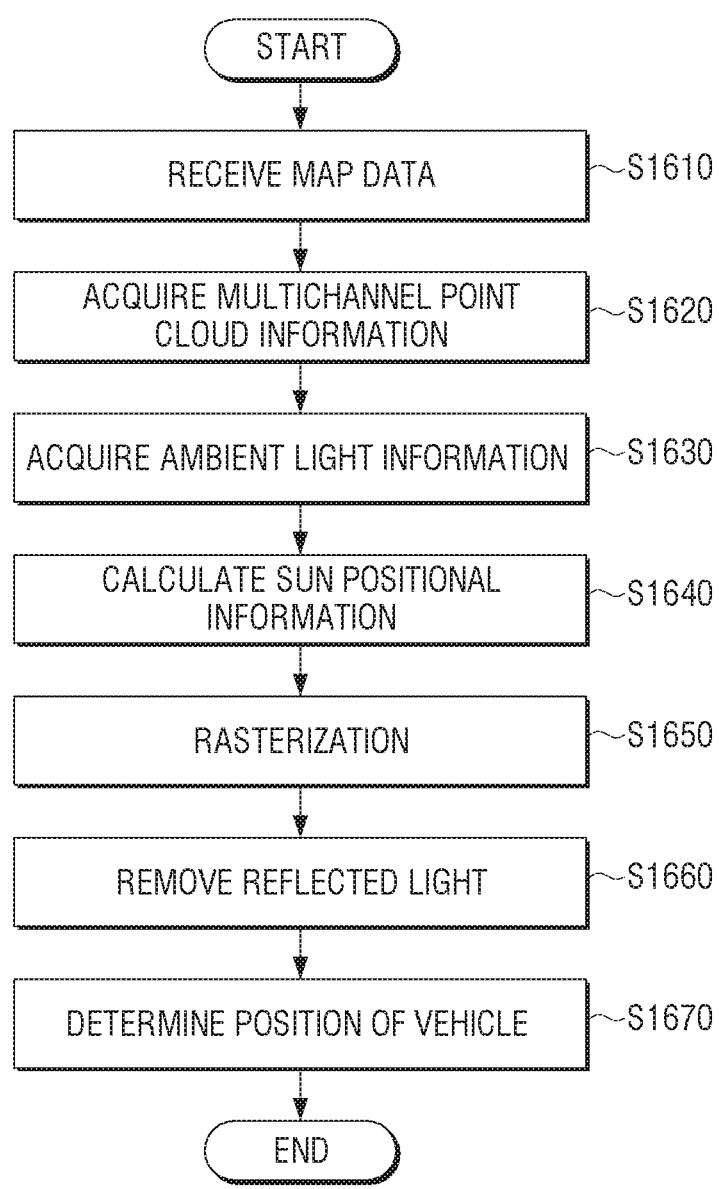

FIGS. 15A, 15B, and 16 are flowcharts of a method of recognizing a position of a vehicle based on a map according to various embodiments of the present disclosure. With regard to a description of FIGS. 15A, 15B, and 16, the same description as the above description will not be repeatedly given here.

FIG. 15A is a flowchart of a method of recognizing a position of a vehicle based on a multichannel map according to an embodiment of the present disclosure.

Referring to FIG. 15A, the map using car 300 may receive multichannel map data from the server 200 in operation S1510-1. In this case, the multichannel map may be a map that is generated by the server 200 or the map generating car 100 based on the multichannel point cloud information acquired by the map generating car 100 including a LiDAR sensor using the same frequency as the LiDAR sensor 310 included in the map using car 300. For example, the multichannel map may be generated as described with reference to FIG. 4A, and in this case, the LiDAR sensor 110-1 of the map generating car 100 and the LiDAR sensor 310 of the map using car 300 may have the same laser frequency for each channel of the LiDAR sensor 310.

The map using car 300 may acquire multichannel point cloud information through the LiDAR sensor 310 in operation S1520-1. Accordingly, the map using car 300 may match the received multichannel map data and the acquired multichannel point cloud information to determine a position of the map using car 300 in the multichannel map in operation S1530-1.

FIG. 15B is a flowchart of a method of recognizing a position of a vehicle based on a single-channel map according to an embodiment of the present disclosure.

Referring to FIG. 15B, the map using car 300 may receive single-channel map data from the server 200 in operation S1510-2. In this case, the single-channel map may also be a map that is generated by the server 200 or the map generating car 100 based on the multichannel point cloud information acquired by the map generating car 100 including a LiDAR sensor using the same frequencies as those of the LiDAR sensor 310 of the map using car 300. For example, the single-channel map may be generated as described with reference to FIG. 4B, and in this case, the LiDAR sensor 110-1 of the map generating car 100 and the LiDAR sensor 310 of the map using car 300 may have the same laser frequency for each channel of the LiDAR sensor 310.

The map using car 300 may acquire multichannel point cloud information on a ground on which the map using car 300 drives, through the LiDAR sensor 310 in operation S1520-2 and multiply the multichannel point cloud information by a weight for each weight to synthesize single-channel point cloud information so as to perform decolorization in operation S1530-2. In detail, the map using car 300 may multiply the point cloud information for each channel by a weight for each channel and sum the point cloud information for each channel, multiplied by a weight, to perform decolorization. In this case, the map using car 300 may calculate variance or standard deviation of reflectivity information included in the point cloud information for each channel and may multiply a channel with a greater calculated variance value or standard deviation by a greater weight, without being limited thereto.

Accordingly, the map using car 300 may match the single-channel map data and the single-channel point cloud information to determine a position of the map using car 300 in the single-channel map in operation S1540-2.

FIG. 16 is a flowchart of a method of recognizing a position of a vehicle based on a map according to an embodiment of the present disclosure.

Referring to FIG. 16, the map using car 300 (illustrated in FIG. 8) may receive map data from the server 200 in operation S1610 and acquire multichannel point cloud information on a surrounding ground through the LiDAR sensor 310 in operation S1620. In this case, the map data may be multichannel map data or single-channel map.

In addition, the map using car 300 may acquire ambient light information in operation S1630 and calculate positional information of the sun in operation S1640. In detail, the map using car 300 may acquire ambient light information such as intensity of sunlight through an ambient light sensor and calculate a position of the sun based on the GPS signal received from the GPS satellite of the sun based on GPS signal from the GPS signal received from the satellite and positional information of the sun based on a current time.

In response to multichannel map data being received, the map using car 300 may perform rasterization on the acquired multichannel point cloud information and generate 2D data for each channel in operation S1650 and apply various algorithms for reflected removal to the rasterized 2D data for each channel to perform reflected-light removal in operation S1660. In this case, the map using car 300 may adjust a degree for removing reflected light based on at least one of ambient light information and a position of the sun.

In response to the single-channel map data being received, the map using car 300 may first decolorize the acquired multichannel point cloud information to synthesize single-channel point cloud information, rasterize the synthesized single-channel point cloud information in operation S1650, and remove reflected light from the rasterized 2D data in operation S1660. In this case, needless to say, a degree for removing reflected light may be adjusted based on at least one of ambient light and positional information of the sun Accordingly, as described above, the map using car 300 may match information from which ambient light is removed and map data to determine a position of the map using car 300 in a map in operation S1670.

Figure 17:
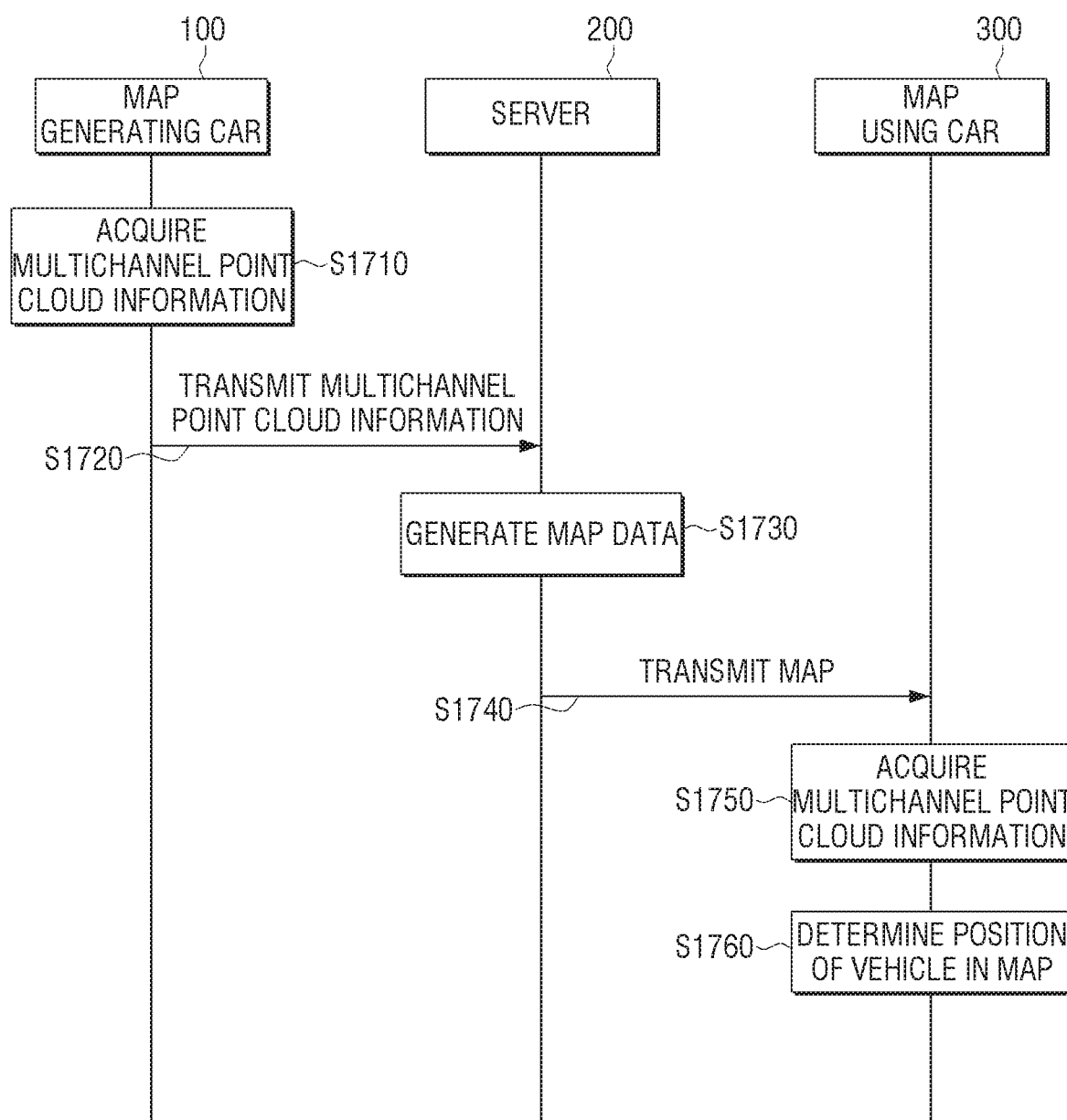
FIG. 17 is a flowchart of a case in which a map is generated and a vehicle recognizes a position based on the generated map in an autonomous driving system according to an embodiment of the present disclosure.

FIG. 17 is a flowchart of a case in which a map is generated and a vehicle recognizes a position based on the generated map in an autonomous driving system according to an embodiment of the present disclosure.

Referring to FIG. 17, the map generating car 100 may acquire multichannel point cloud information on the ground through the multichannel LiDAR sensor in operation S1710 and transmit the same to the server 200 in operation S1720. Accordingly, the server 200 may generate a map using the multichannel point cloud information received from the map generating car 100 in operation S1730 and store the map. In this case, the server 200 may generate a multichannel map or perform decolorization on the multichannel point cloud information to generate a single-channel map.

Accordingly, in operation S1740, the server 200 may transmit the stored map to the map using car 300 according to a map data transmitting request from the map using car 300.

The map using car 300 may acquire multichannel point cloud information through the multichannel LiDAR sensor 310 in operation S1750 and determine a position in the map received from the server 200 based on the acquired multichannel point cloud information in operation S1760.

According to the aforementioned various embodiments of the present disclosure, a detailed map with an error range less than a centimeter unit may be generated and a position of a vehicle may be accurately determined in the generated detailed map. Accordingly, autonomous driving of the vehicle may be easily achieved.

The methods of recognizing a position of a vehicle based on a map or the operations of the processors 320 and 320-1 and the single-channel map 327-8 of the map using car 300 according to the aforementioned various embodiments of the present disclosure may be generated and installed in a vehicle.

For example, a program to perform the methods of recognizing a position of a vehicle based on a map, including receiving map data from an external server, acquiring point cloud information for each channel on a surrounding ground of the vehicle using a multichannel LiDAR sensor, and determining a position of the vehicle in the map data based on the point cloud information for each channel may be stored in a non-transitory computer readable medium, and be provided.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disk, a Blu-ray disc, a universal serial bus (USB), a memory card, a read only memory (ROM), and the like, and may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A vehicle comprising:
   a light detection and ranging (LiDAR) sensor configured to obtain point cloud information for each channel on a surface of a surrounding ground of the vehicle using a multichannel laser;
   a communicator configured to communicate with an external server storing map data comprising the point cloud information for each channel on the surface; and
   a processor configured to:
      control the communicator to receive the map data comprising the point cloud information for each channel on the surface from the external server,
      identify point cloud information, matching the obtained point cloud information, among the point cloud information in the map data,
      identify an area corresponding to the identified point cloud information among a plurality of areas in the map data, and
      identify a position of the vehicle as the identified area, wherein the map data stored in the external server is a single-channel map data synthesizing reflectivity information for each channel of the multichannel laser; and wherein the processor is further configured to:
synthesize the point cloud information for each channel into single-channel point cloud information, and
match the single-channel point cloud information and the single-channel map data to identify the position of the vehicle.

2. The vehicle as claimed in claim 1,
wherein the map data comprises multichannel map data comprising reflectivity information for each channel of a multichannel laser that generates the map data; and
wherein the processor is further configured to match the point cloud information for each channel and the multichannel map data to determine the position of the vehicle.

3. The vehicle as claimed in claim 1, wherein the processor is further configured to:
multiply reflectivity information of the point cloud information for each channel by a weight for each channel, and
after the reflectivity information is multiplied, sum the reflectivity information for each channel to synthesize the point cloud information for each channel into the single-channel point cloud information.

4. The vehicle as claimed in claim 3, wherein the processor is further configured to:
calculate a variance or a standard deviation of the reflectivity information of the point cloud information for each channel, and
multiply a channel with a greater calculated variance value or standard deviation by a greater weight.

5. The vehicle as claimed in claim 1, wherein the processor is further configured to:
rasterize the point cloud information into two-dimensional (2D) data,
remove reflected light from the 2D data, and
after the reflected light is removed from the 2D data, match the 2D data with the map data to determine the position of the vehicle.

6. The vehicle as claimed in claim 5, further comprising:
an ambient light sensor configured to detect an intensity of ambient light around the vehicle,
wherein the processor is further configured to control the removing of the reflected light based on the intensity of ambient light.

7. The vehicle as claimed in claim 5, further comprising:
a global positioning system (GPS) receiver configured to receive a GPS signal comprising positional information of the vehicle,
wherein the processor is further configured to:
determine a position of the sun based on the GPS signal and a current time, and
control the removing of the reflected light based on the position of the sun.

8. The vehicle as claimed in claim 1, further comprising:
a global positioning system (GPS) receiver configured to receive a GPS signal comprising positional information of the vehicle,
wherein the processor is further configured to:
determine the position of the vehicle using the GPS signal, and
determine the position of the vehicle in the map data based on the position of the vehicle.

9. The vehicle as claimed in claim 8, wherein the processor is further configured to control the communicator to receive the map data corresponding to a preset distance range from the position of the vehicle from the external server.

10. A method of recognizing a position of a vehicle based on a map, the method comprising:
obtaining point cloud information for each channel on a surface of a surrounding ground of the vehicle using a multichannel light detection and ranging (LiDAR) sensor;
receiving map data comprising the point cloud information for each channel on the surface from an external server;
identifying point cloud information, matching the obtained point cloud information, among the point cloud information in the map data;
identifying an area corresponding to the identified point cloud information among a plurality of areas in the map data; and
identifying a position of the vehicle as the identified area,
wherein the map data stored in the external server is a single-channel map data synthesizing reflectivity information for each channel of the multichannel laser, and
wherein the identifying of the position of the vehicle comprises:
synthesizing the point cloud information for each channel into single-channel point cloud information, and
matching the single-channel point cloud information and the single-channel map data to identify the position of the vehicle.

11. The method as claimed in claim 10,
wherein the map data comprises multichannel map data comprising reflectivity information for each channel of a multichannel laser that generates the map data; and
wherein the identifying of the position of the vehicle comprises matching the point cloud information for each channel and the multichannel map data to determine the position of the vehicle.

12. The method as claimed in claim 10, wherein the synthesizing of the point cloud information comprises:
multiplying reflectivity information of the point cloud information for each channel by a weight for each channel; and
after the reflectivity information is multiplied, summing the reflectivity information for each channel to synthesize the point cloud information for each channel into the single-channel point cloud information.

13. The method as claimed in claim 12, wherein the multiplying of the reflectivity information with the weight comprises:
calculating a variance or a standard deviation of the reflectivity information of the point cloud information for each channel; and
multiplying a channel with a greater calculated variance value or standard deviation by a greater weight.

14. The method as claimed in claim 10, wherein the identifying of the position of the vehicle comprises:
rasterizing the point cloud information into two-dimensional (2D) data;
removing reflected light from the 2D data; and
after the reflected light is removed from the 2D data, matching the 2D data with the map data to determine the position of the vehicle.

15. The method as claimed in claim 14, further comprising:
detecting an intensity of ambient light around the vehicle,
wherein the removing of the reflected light is based on the intensity of ambient light around the vehicle.

16. The method as claimed in claim 14, further comprising:
- receiving a global positioning system (GPS) signal comprising positional information of the vehicle,
- wherein the removing of the reflected light comprises:
  - determining a position of the sun based on the GPS signal and a current time, and
  - controlling the removing of the reflected light based on the position of the sun.

17. The method as claimed in claim 10, further comprising:
- receiving a global positioning system (GPS) signal comprising positional information of the vehicle,
- wherein the identifying of the position of the vehicle comprises:
  - determining the position of the vehicle using the GPS signal, and
  - determining the position of the vehicle in the map data based on the position of the vehicle, and
- wherein the receiving of the map data comprises receiving the map data corresponding to a preset distance range from the position of the vehicle from the external server.

18. A non-transitory computer-readable storage medium storing instructions that, when executed, cause at least one processor to perform the method of claim 10.

* * * * *